(12) United States Patent
Hori et al.

(10) Patent No.: US 11,559,850 B2
(45) Date of Patent: Jan. 24, 2023

(54) METHOD FOR MANUFACTURING LIQUID-COOLED JACKET

(71) Applicant: NIPPON LIGHT METAL COMPANY, LTD., Tokyo (JP)

(72) Inventors: Hisashi Hori, Shizuoka (JP); Nobushiro Seo, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 237 days.

(21) Appl. No.: 16/486,791

(22) PCT Filed: Jun. 13, 2017

(86) PCT No.: PCT/JP2017/021852
§ 371 (c)(1),
(2) Date: Aug. 16, 2019

(87) PCT Pub. No.: WO2018/193639
PCT Pub. Date: Oct. 25, 2018

(65) Prior Publication Data
US 2019/0358740 A1    Nov. 28, 2019

(30) Foreign Application Priority Data

Apr. 18, 2017 (JP) .............................. JP2017-082220
Apr. 18, 2017 (JP) .............................. JP2017-082221

(51) Int. Cl.
*B23K 20/12* (2006.01)
*B23K 103/10* (2006.01)

(52) U.S. Cl.
CPC ........ *B23K 20/122* (2013.01); *B23K 2103/10* (2018.08)

(58) Field of Classification Search
CPC .............. B23K 20/129; B23K 2103/10; B23K 20/122–128
(Continued)

(56) References Cited

U.S. PATENT DOCUMENTS

2018/0043465 A1*  2/2018  Hori ..................... B23K 20/127

FOREIGN PATENT DOCUMENTS

JP    2003-225779 A    8/2003
JP    2009-166079 A    7/2009
(Continued)

OTHER PUBLICATIONS

Machine Translation for JP-5168212-B2 (Year: 2013).*
(Continued)

*Primary Examiner* — David P Bryant
*Assistant Examiner* — Christine Bersabal
(74) *Attorney, Agent, or Firm* — Merchant & Gould P.C.

(57) ABSTRACT

A jacket main body is formed of a first aluminum alloy. A seal body is formed of a second aluminum alloy. The first aluminum alloy is higher in hardness than the second aluminum alloy in material type. A method includes: a preparing step of forming on an peripheral wall part a step part having a step bottom surface and a step side surface obliquely rising; a mounting step of mounting the seal body on the jacket main body to form a first butt portion and putting the step bottom surface and a back surface of the seal body on each other to form a second butt portion; a main joining step of performing friction stir welding while only the stirring pin of the rotary tool rotating contacts with only the seal body.

14 Claims, 22 Drawing Sheets

(58) Field of Classification Search
USPC .............................................. 228/112.1, 2.1
See application file for complete search history.

(56) References Cited

FOREIGN PATENT DOCUMENTS

| JP | 2010-036230 A | 2/2010 | |
|----|---------------|--------|---|
| JP | 2010-245085 A | 10/2010 | |
| JP | 2010-279958 A | 12/2010 | |
| JP | 5136516 B2 * | 2/2013 | ............. B23K 20/12 |
| JP | 5168212 B2 * | 3/2013 | ............. B23K 20/12 |
| JP | 2015-131321 A | 7/2015 | |
| TW | I294810 B * | 3/2008 | |
| WO | 2016/132768 A1 | 8/2016 | |

OTHER PUBLICATIONS

Machine Translation for JP-5136516-B2 (Year: 2013).*
Machine Translation of TWI294810B (Year: 2008).*
Office Action for Japanese Patent Application No. 2019-513210, dated Jan. 14, 2020.
International Search Report for No. PCT/JP2017/021852, dated Aug. 22, 2017.

* cited by examiner

FIG. 15

| | | X POINT | Y POINT | Z POINT |
|---|---|---|---|---|
| No. 1 | OFFSET AMOUNT N: 0.0mm  5000 rpm | | | |
| No. 2 | OFFSET AMOUNT N: 0.25mm  5000 rpm | | | |
| No. 3 | OFFSET AMOUNT N: 0.50mm  5000 rpm | | | |
| No. 4 | OFFSET AMOUNT N: 0.25mm  7000 rpm | | | |

FIG. 16

| | | X POINT | Y POINT | Z POINT | TENSILE STRENGTH (N/mm) |
|---|---|---|---|---|---|
| No. 1 | 5000 rpm OFFSET AMOUNT N: 0.0mm | | | | 278 |
| No. 2 | 5000 rpm OFFSET AMOUNT N: 0.25mm | | | | 283 |

FIG. 17

| | X POINT | Y POINT | Z POINT | TENSILE STRENGTH (N/mm) |
|---|---|---|---|---|
| No. 3 — 5000 rpm, OFFSET AMOUNT N: 0.50mm | 21 J13 W 22 | J13 W | J13 W | 75 |
| No. 4 — 7000 rpm, OFFSET AMOUNT N: 0.25mm | 21 J14 W 22 | J14 W | J14 W | 276 |

FIG. 18

| | | W | W | | |
|---|---|---|---|---|---|
| | F700 mm/MINUTE | | | | |
| | F500 mm/MINUTE | | | | |
| | F300 mm/MINUTE | | | | |
| | 7500 rpm | 10000 rpm | | | |
| | OFFSET AMOUNT N: 0.25mm | OFFSET AMOUNT N: 0.25mm | | | |
| | No. 5 | No. 6 | | | |

FIG. 19

| No. | | F300 mm/MINUTE | F500 mm/MINUTE | F700 mm/MINUTE |
|---|---|---|---|---|
| No. 5 | 7500 rpm | W | W | W |
| | TENSILE STRENGTH (N/mm) | 318 | 316 | 318 |
| No. 6 | 10000 rpm | W | W | W |
| | TENSILE STRENGTH (N/mm) | 326 | 327 | 328 |

| | | OFFSET AMOUNT N:0.05mm | OFFSET AMOUNT N:0.25mm | OFFSET AMOUNT N:0.45mm |
|---|---|---|---|---|
| No. 7 | 7500 rpm | | | |
| | TENSILE STRENGTH (N/mm) | 255 | 286 | 313 |
| No. 8 | 7500 rpm | OFFSET AMOUNT N:0.65mm | OFFSET AMOUNT N:0.85mm | OFFSET AMOUNT N:1.05mm |
| | TENSILE STRENGTH (N/mm) | 301 | 278 | 296 |

METHOD FOR MANUFACTURING LIQUID-COOLED JACKET

This application is a National Stage Application of PCT/JP2017/021852, filed Jun. 13, 2017, which claims benefit of priority to Japanese Patent Application No. 2017-082220, filed Apr. 18, 2017 and Japanese Patent Application No. 2017-082221, filed Apr. 18, 2017, which applications are incorporated herein by reference. To the extent appropriate, a claim of priority is made to each of the above disclosed applications.

TECHNICAL FIELD

The present invention relates to a method for manufacturing a liquid-cooled jacket.

BACKGROUND ART

For example, Patent Literature 1 discloses a method for manufacturing a liquid-cooled jacket. FIG. 24 is a sectional view showing a conventional method for manufacturing a liquid-cooled jacket. In the conventional method for manufacturing a liquid-cooled jacket, friction stir welding is performed on a butt portion J10 formed by butting a step side surface 101c provided in a step part of a jacket main body 101 made of an aluminum alloy and a side surface 102c of a seal body 102 made of an aluminum alloy. In the conventional method for manufacturing a liquid-cooled jacket, only a stirring pin F2 of a rotary tool F is inserted into the butt portion J10 to perform the friction stir welding. In the conventional method for manufacturing a liquid-cooled jacket, a rotation center axis C of the rotary tool F is made to coincide with the butt portion J10 and relatively moved.

CITATION LIST

Patent Literature

Patent Literature 1: Japanese Patent Application Publication No. 2015-131321

SUMMARY OF INVENTION

Technical Problem

The jacket main body 101 tends to have a complicated shape. For example, a jacket main body formed of a cast material of a 4000 series aluminum alloy and having a relatively simple shape like the seal body 102 is sometimes formed of a wrought material of a 1000 series aluminum alloy. In this way, a liquid-cooled jacket is sometimes manufactured by joining members of different material types of aluminum alloys. In such a case, in general, the jacket main body 101 has higher hardness than the seal body 102. Therefore, when friction stir welding is performed as shown in FIG. 24, material resistance received by the stirring pin from the jacket main body 101 side is large compared with material resistance received by the stirring pin from the seal body 102. Therefore, there is a problem in that it is difficult to stir the different material types with the stirring pin of the rotary tool F in a well-balanced state and a void defect occurs in a plasticized region after the joining, and joining strength is deteriorated.

From such a viewpoint, an object of the present invention is to provide a method for manufacturing a liquid-cooled jacket that makes aluminum alloys of different material types appropriately joined together.

Solution to Problem

To achieve the above-described object, a first invention is a method for manufacturing a liquid-cooled jacket for joining, which includes providing a jacket main body including a bottom part and a peripheral wall part rising from a peripheral edge of the bottom part; a seal body configured to seal an opening part of the jacket main body; and a rotary tool with a stirring pin to be used for joining the jacket main body and the seal body together, the jacket main body being formed of a first aluminum alloy, the seal body being formed of a second aluminum alloy, the first aluminum alloy being higher in hardness than the second aluminum alloy in material type, the stirring pin having an outer peripheral surface inclined to taper. The method includes a preparing step of forming a step part having a step bottom surface and a step side surface on an inner peripheral edge of the peripheral wall part, the step side surface rising obliquely from the step bottom surface to expand toward the opening part. The method includes a mounting step of mounting the seal body on the jacket main body and butting the step side surface and a side surface of the seal body to form a first butt portion and putting the step bottom surface and a back surface of the seal body on each other to form a second butt portion. The method includes a main joining step of turning around a rotary tool along the first butt portion and performing friction stir welding while only the stirring pin of the rotary tool rotating contacts with only the seal body.

With such a manufacturing method, the second aluminum alloy on the seal body side of the first butt portion is mainly stirred and plastically fluidized under frictional heat of the seal body and the stirring pin. The step side surface and the side surface of the seal body are joined together in the first butt portion. Only the stirring pin is brought into contact with only the seal body to perform the friction stir welding, and the first aluminum alloy is hardly mixed in the seal body from the jacket main body. Consequently, the second aluminum alloy on the seal body side is mainly frictionally stirred in the first butt portion, which prevents deterioration in joining strength. The step side surface of the jacket main body is inclined outside, which makes contact of the stirring pin to the jacket main body easily avoided without causing the deterioration in the joining strength.

A second invention is a method for manufacturing a liquid-cooled jacket for joining, which includes providing a jacket main body including a bottom part and a peripheral wall part rising from a peripheral edge of the bottom part; a seal body configured to seal an opening part of the jacket main body; and a rotary tool with a stirring pin to be used for joining the jacket main body and the seal body together, the jacket main body being formed of a first aluminum alloy, the seal body being formed of a second aluminum alloy, the first aluminum alloy being higher in hardness than the second aluminum alloy in material type, the stirring pin having an outer peripheral surface inclined to taper. The method includes a preparing step of forming a step part having a step bottom surface and a step side surface on an inner peripheral edge of the peripheral wall part, the step side surface rising obliquely from the step bottom surface to expand toward the opening part. The method includes a mounting step of mounting the seal body on the jacket main body and butting the step side surface and a side surface of the seal body to form a first butt portion and putting the step bottom surface and a back surface of the seal body on each other to form a second butt portion. The method includes a main joining step of turning around a rotary tool along the first butt portion and performing friction stir welding while only the stirring pin of the rotary tool rotating contacts with the seal body and slightly contacts with the step side surface of the jacket main body.

With such a manufacturing method, the outer peripheral surface of the stirring pin is only brought into slight contact with the step side surface of the jacket main body, and mixing of the first aluminum alloy from the jacket main body into the seal body is reduced as much as possible. Consequently, the second aluminum alloy on the seal body side is mainly frictionally stirred in the first butt portion, which prevents the deterioration in the joining strength. The step side surface of the jacket main body is inclined outside, which makes it is possible to join the first butt portion without the stirring pin greatly invading into the jacket main body side.

It is preferable that a plate thickness of the seal body is set larger than a height of the step side surface. Such a manufacturing method makes metal insufficiency of a joined part easily supplemented.

It is preferable that an inclination angle of the outer peripheral surface of the stirring pin is set equal to an inclination angle of the step side surface. Such a manufacturing method, in the first invention, brings the stirring pin close to the jacket main body while preventing the stirring pin and the step side surface from coming into contact with each other. The second invention makes it possible to uniformly join the first butt portion without the stirring pin greatly invading into the jacket main body side.

It is preferable that an inclined surface is formed on the side surface of the seal body, and, in the mounting step, the step side surface and the inclined surface are brought into surface contact with each other. Such a manufacturing method makes metal insufficiency of the joined part easily supplemented.

It is preferable that the seal body is formed of an aluminum alloy wrought material, and the jacket main body is formed of an aluminum alloy cast material.

It is preferable that the rotary tool is rotated clockwise with an outer peripheral surface of the rotary tool having a spiral groove engraved counterclockwise from a proximal end thereof toward a distal end thereof, and the rotary tool is rotated counterclockwise with an outer peripheral surface of the rotary tool having a spiral groove engraved clockwise from a proximal end thereof toward a distal end thereof.

With such a manufacturing method, plastically fluidized metal is guided to a distal end side of the stirring pin by the spiral groove, which reduces occurrence of a burr.

It is preferable that in the main joining step a rotating direction and a traveling direction of the rotary tool are set such that a plasticized region formed in a moving track of the rotary tool has a region for the jacket main body side corresponding to a shear side and a region for the seal body side corresponding to a flow side.

With such a manufacturing method, the region for the jacket main body side is the shear side. Stirring action by the stirring pin around the first butt portion increases so that temperature rise in the first butt portion is expected. The step side surface and the side surface of the seal body in the first butt portion are more securely joined together.

A third invention is a method for manufacturing a liquid-cooled jacket for joining, which includes providing a jacket main body including a bottom part and a peripheral wall part rising from a peripheral edge of the bottom part; a seal body configured to seal an opening part of the jacket main body; and a rotary tool with a stirring pin to be used for joining the jacket main body and the seal body together, the jacket main body being formed of a first aluminum alloy, the seal body being formed of a second aluminum alloy, the first aluminum alloy being higher in hardness than the second aluminum alloy in material type, the stirring pin having an outer peripheral surface inclined to taper and having a flat distal end face. The method includes a preparing step of forming a step part having a step bottom surface and a step side surface on an inner peripheral edge of the peripheral wall part, the step side surface rising obliquely from the step bottom surface to expand toward the opening part. The method includes a mounting step of mounting the seal body on the jacket main body and butting the step side surface and a side surface of the seal body to form a first butt portion and putting the step bottom surface and a back surface of the seal body on each other to form a second butt portion. The method includes a main joining step of turning around a rotary tool along the first butt portion and performing friction stir welding while only the stirring pin of the rotary tool rotating contacts with the seal body, a distal end of the stirring pin is inserted more deeply than the step bottom surface, and the outer peripheral surface of the stirring pin and the step side surface are spaced apart from each other.

With such a manufacturing method, the second aluminum alloy on the seal body side of the first butt portion is stirred and plastically fluidized by frictional heat of the seal body and the stirring pin. The step side surface and the side surface of the seal body are joined in the first butt portion. Only the stirring pin is brought into contact with only the seal body to perform the friction stir welding in the first butt portion, and the first aluminum alloy is hardly mixed in the seal body from the jacket main body. Consequently, the second aluminum alloy on the seal body side is mainly frictionally stirred in the first butt portion, which prevents deterioration in joining strength. The step side surface of the jacket main body is inclined outside, which easily avoids contact of the stirring pin to the jacket main body without causing the deterioration in the joining strength. The second butt portion are also securely frictionally stirred by inserting the distal end face of the stirring pin more deeply than the step bottom surface, thereby increasing the joining strength.

A fourth invention is a method for manufacturing a liquid-cooled jacket for joining, which includes providing a jacket main body including a bottom part and a peripheral wall part rising from a peripheral edge of the bottom part; a seal body configured to seal an opening part of the jacket main body; and a rotary tool with a stirring pin to be used for joining the jacket main body and the seal body together, the jacket main body being formed of a first aluminum alloy, the seal body being formed of a second aluminum alloy, the first aluminum alloy being higher in hardness than the second aluminum alloy in material type, the stirring pin having an outer peripheral surface inclined to taper and having a flat distal end face. The method includes a preparing step of forming a step part having a step bottom surface and a step side surface on an inner peripheral edge of the peripheral wall part, the step side surface rising obliquely from the step bottom surface to expand toward the opening part. The method includes a mounting step of mounting the seal body on the jacket main body and butting the step side surface and a side surface of the seal body to form a first butt portion and putting the step bottom surface and a back surface of the seal body on each other to form a second butt portion. The method includes a main joining step of turning around a rotary tool along the first butt portion and performing friction stir welding while only the stirring pin of the rotary tool rotating contacts with the seal body, a distal end of the stirring pin is inserted more deeply than the step bottom surface, and the outer peripheral surface of the stirring pin slightly contact with the step side surface.

With such a manufacturing method, the outer peripheral surface of the stirring pin is only brought into slight contact with the step side surface of the jacket main body, and mixing of the first aluminum alloy from the jacket main body into the seal body is reduced as much as possible. Consequently, the second aluminum alloy on the seal body side is mainly frictionally stirred in the first butt portion, which prevents deterioration in joining strength. The step side surface of the jacket main body is inclined outside, which makes it possible to join the first butt portion without the stirring pin greatly invading into the jacket main body side. The second butt portion is also securely frictionally stirred by inserting the distal end face of the stirring pin more deeply than the step bottom surface, which increases the joining strength.

It is preferable that a plate thickness of the seal body is set larger than a height of the step side surface. Such a manufacturing method makes metal insufficiency of a joined part easily supplemented.

It is preferable that an inclination angle of the outer peripheral surface of the stirring pin is set equal to an inclination angle of the step side surface. Such a manufacturing method in the third invention makes the stirring pin brought close to the jacket main body while the stirring pin and the step side surface are prevented from coming into contact with each other. The fourth invention makes it possible to uniformly join the first butt portion without the stirring pin greatly invading into the jacket main body side.

It is preferable that an inclination angle of the outer peripheral surface of the stirring pin is set equal to an inclination angle of the step side surface. Such a manufacturing method makes metal insufficiency of the joined part easily supplemented.

It is preferable that the seal body is formed of an aluminum alloy wrought material, and the jacket main body is formed of an aluminum alloy cast material.

It is preferable that the rotary tool is rotated clockwise with an outer peripheral surface of the rotary tool having a spiral groove engraved counterclockwise from a proximal end thereof toward a distal end thereof, and the rotary tool is rotated counterclockwise with an outer peripheral surface of the rotary tool having a spiral groove engraved clockwise from a proximal end thereof toward a distal end thereof.

With such a manufacturing method, plastically fluidized metal is guided to a distal end side of the stirring pin by the spiral groove, thereby reducing occurrence of a burr.

It is preferable that in the main joining step a rotating direction and a traveling direction of the rotary tool are set such that a plasticized region formed in a moving track of the rotary tool has a region for the jacket main body side corresponding to a shear side and a region for the seal body side corresponding to a flow side.

With such a manufacturing method, the jacket main body side is the shear side. Stirring action by the stirring pin around the first butt portion increases so that temperature rise in the first butt portion is expected. The step side surface and the side surface of the seal body in the first butt portion more securely joined together.

Advantageous Effects of Invention

The method for manufacturing a liquid-cooled jacket according to the present invention makes aluminum alloys of different material types appropriately joined together.

BRIEF DESCRIPTION OF DRAWINGS

FIG. 15 is a plan view showing a test result of the first test according to the example;

FIG. 16 is a sectional view showing a test result of the first test according to the example;

FIG. 17 is a sectional view showing a test result of the first test according to the example;

FIG. 18 is a plan view showing a test result of a second test according to the example;

FIG. 19 is a sectional view showing a test result of the second test according to the example;

FIG. 20 is a plan view showing a test result of a third test according to the example;

FIG. 21 is a sectional view showing a test result of the third test according to the example;

DESCRIPTION OF EMBODIMENTS

First Embodiment

Figure 1:
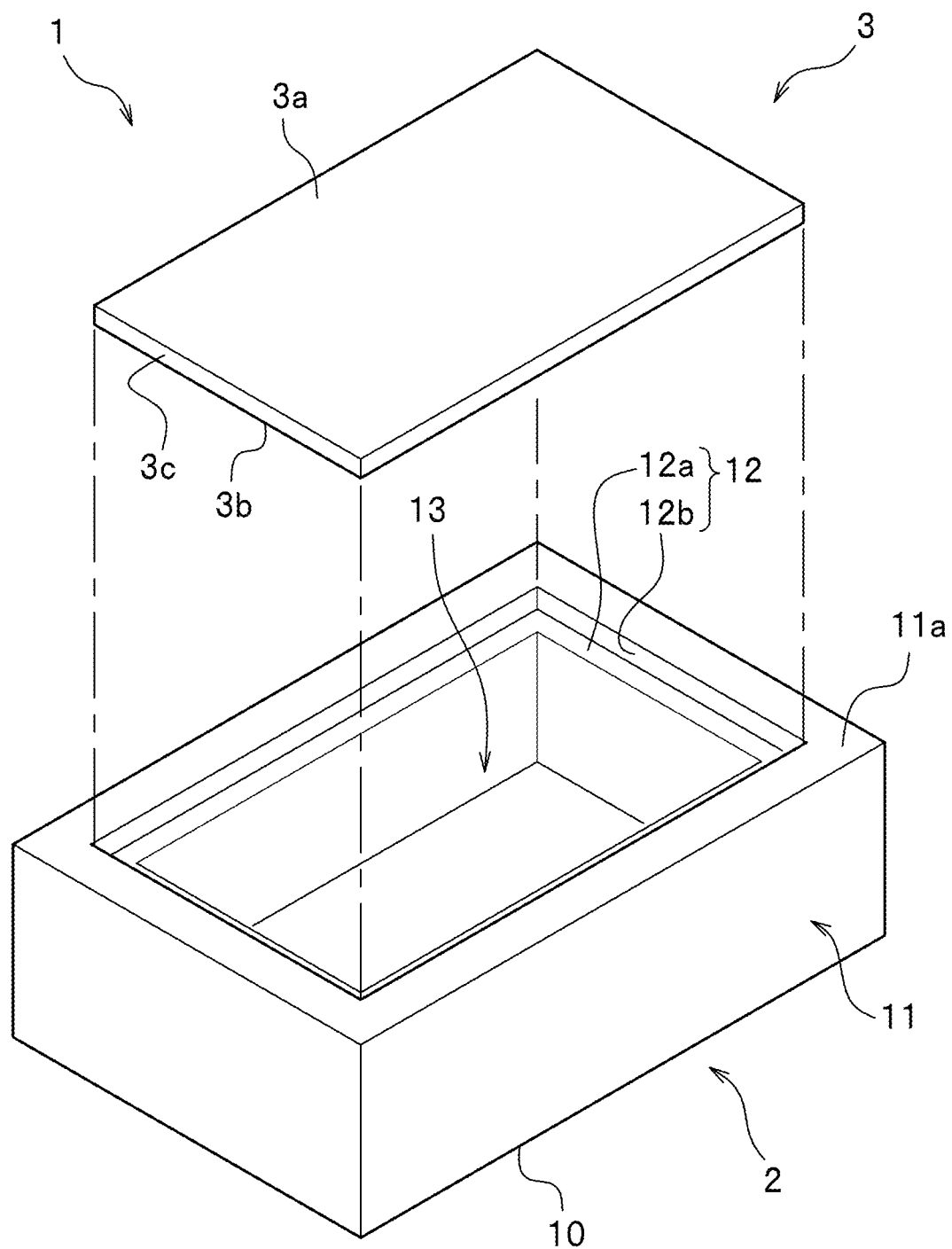
FIG. 1 is a perspective view showing a preparation step of a method for manufacturing a liquid-cooled jacket according to a first embodiment of the present invention.

A method for manufacturing a liquid-cooled jacket according to an embodiment of the present invention is explained in detail with reference to the drawings. As shown in FIG. 1, a jacket main body 2 and a seal body 3 is frictionally stir-welded to manufacture a liquid-cooled jacket 1. The liquid-cooled jacket 1 is a member in which a heat generating body (not shown in the figure) is set on the seal body 3 and fluid is fed on the inside to perform heat exchange with the heat generating body. Note that a "front surface" in the following explanation means a surface on the opposite side of a "back surface".

In the method for manufacturing a liquid-cooled jacket according to this embodiment, a preparation step, a mounting step, and a main joining step are performed. The preparation step is a step of preparing the jacket main body 2 and the seal body 3. The jacket main body 2 is mainly configured by a bottom part 10 and a peripheral wall part 11. The jacket main body 2 is formed mainly including a first aluminum alloy. As the first aluminum alloy, an aluminum alloy cast material such as JISH5302 ADC12 (Al—Si—Cu-based) is used.

Figure 2:
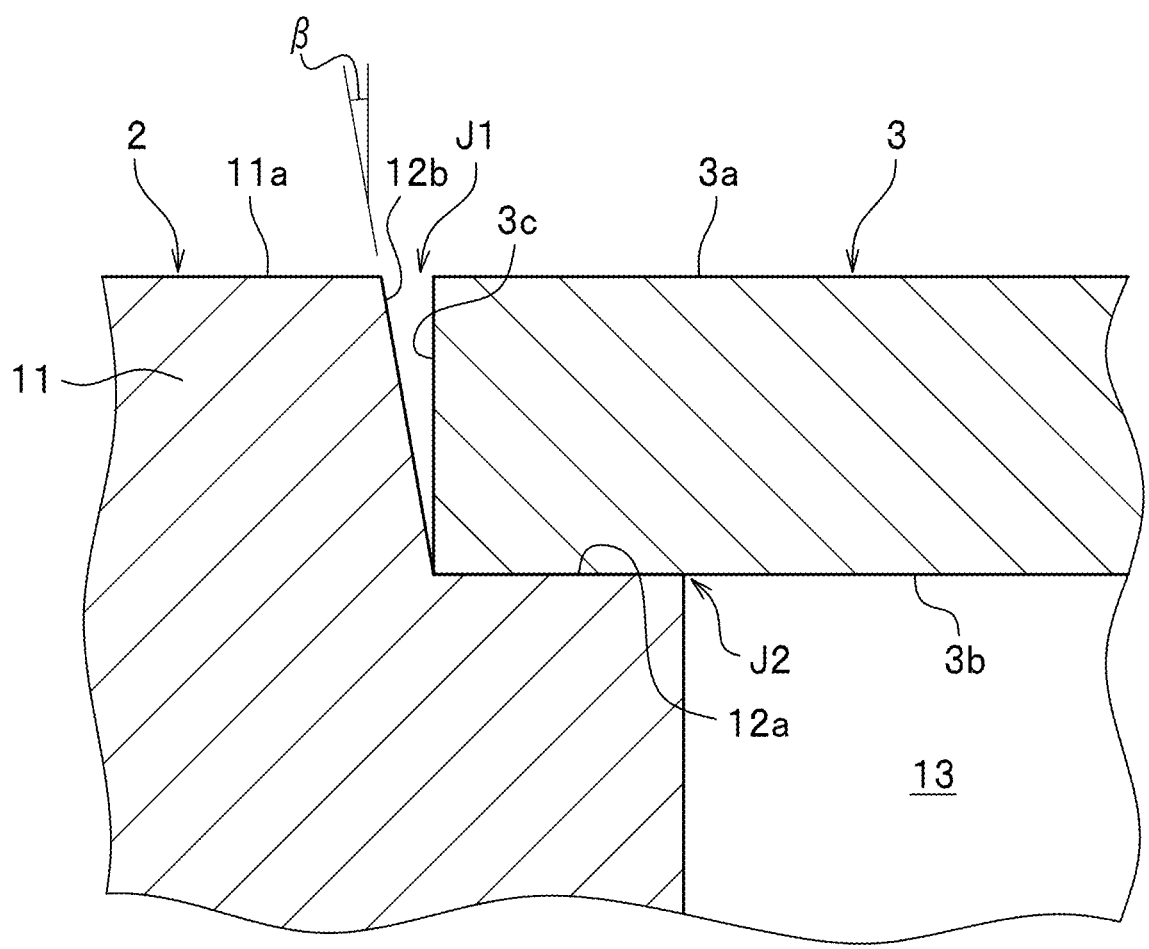
FIG. 2 is a sectional view showing a mounting step of the method for manufacturing the liquid-cooled jacket according to the first embodiment.

As shown in FIG. 1, the bottom part 10 is a tabular member assuming a rectangular shape in plan view. The peripheral wall part 11 is a wall part rising in a rectangular frame shape from the peripheral edge part of the bottom part 10. A step part 12 is formed at the inner peripheral edge of the peripheral wall part 11. The step part 12 is constituted by a step bottom surface 12a and a step side surface 12b rising from the step bottom surface 12a. As shown in FIG. 2, the step side surface 12b is inclined to expand to the outer side from the step bottom surface 12a toward an opening part. An inclination angle β of the step side surface 12b only has to be set as appropriate. For example, the inclination angle β is set to 3° to 30° with respect to the vertical plane. A recessed part 13 is formed by the bottom part 10 and the peripheral wall part 11.

The seal body 3 is a tabular member that seals the opening part of the jacket main body 2. The seal body 3 is formed in a size mounted on the step part 12. The plate thickness of the seal body 3 is substantially equal to the height of the step side surface 12b. The seal body 3 is formed mainly including a second aluminum alloy. The second aluminum alloy is a material having hardness lower than the hardness of the first aluminum alloy. The second aluminum alloy is formed of an aluminum alloy wrought material such as JIS A1050, A1100, or A6063.

As shown in FIG. 2, the mounting step is a step of mounting the seal body 3 on the jacket main body 2. In the mounting step, the back surface 3b of the seal body 3 is mounted on the step bottom surface 12a. The step side surface 12b and a side surface 3c of the seal body 3 are butted to form a first butt portion J1. The first butt portion J1 can include being formed by bringing the step side surface 12b and the side surface 3c of the seal body 3 into surface contact with each other and being formed by butting the step side surface 12b and the side surface 3c of the seal body 3 with a gap having a substantial V shape in cross section as in this embodiment. The step bottom surface 12a and the back surface 3b of the seal body 3 are butted to form a second butt portion J2. In this embodiment, when the seal body 3 is mounted, the end face 11a of the peripheral wall part 11 and the front surface 3a of the seal body 3 are flush with each other.

Figure 3:
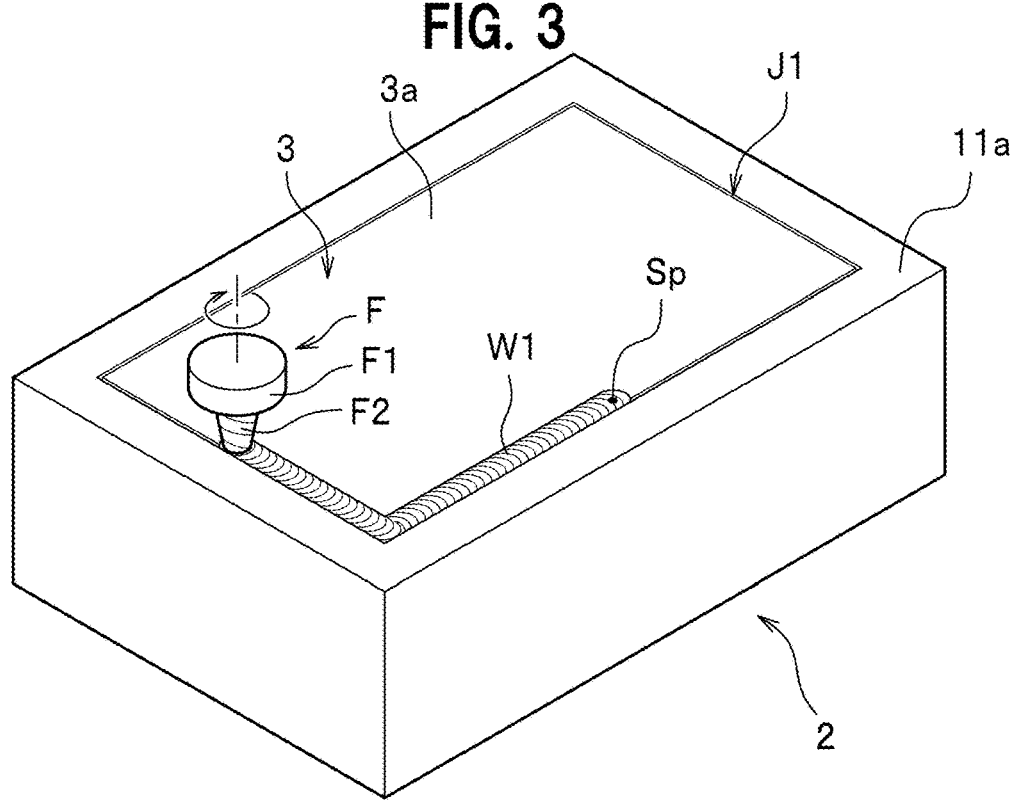
FIG. 3 is a perspective view showing a main joining step of the method for manufacturing the liquid-cooled jacket according to the first embodiment.
Figure 4:
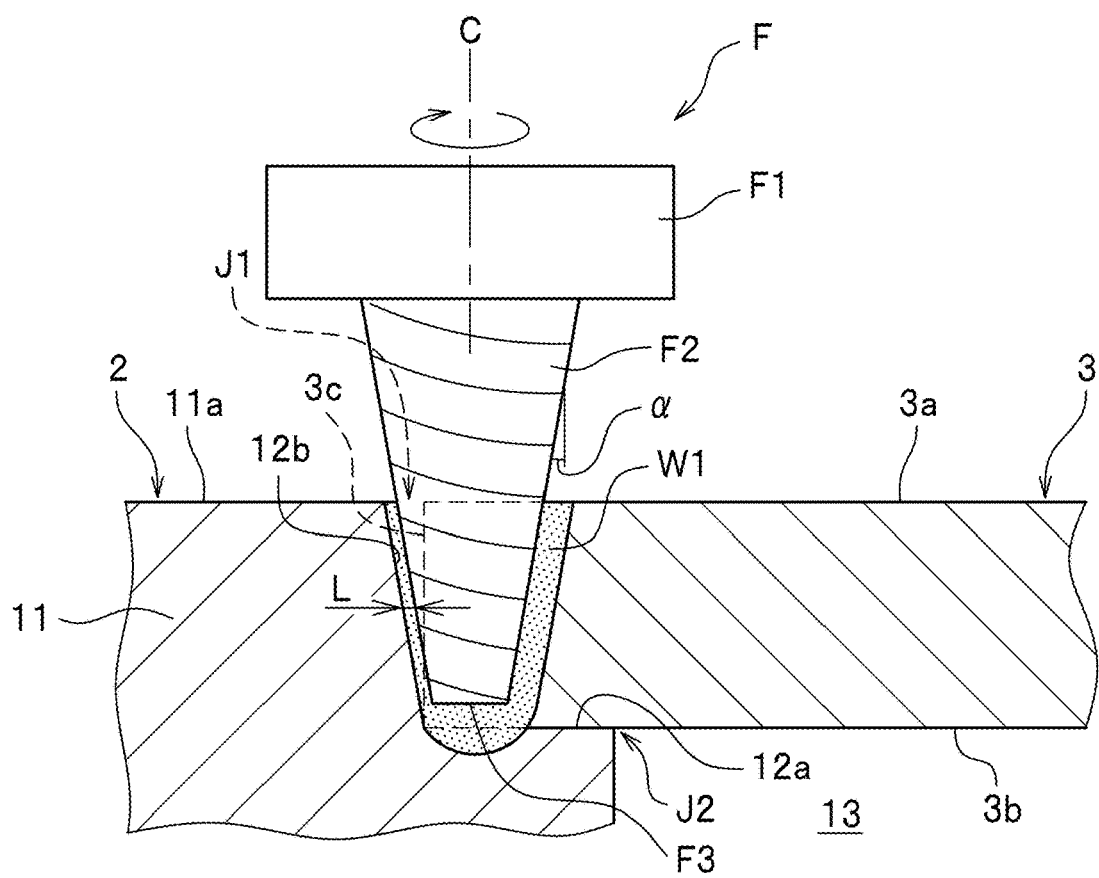
FIG. 4 is a sectional view showing the main joining step of the method for manufacturing the liquid-cooled jacket according to the first embodiment.

As shown in FIG. 3 and FIG. 4, the main joining step is a step of frictionally stir-welding the jacket main body 2 and the seal body 3 using a rotary tool F. The rotary tool F is configured by a coupled part F1 and a stirring pin F2. The rotary tool F is formed of, for example, tool steel. The coupled part F1 is a part coupled to a rotating shaft of a friction stir device (not shown in the figures). The coupled part F1 assumes a columnar shape. A screw hole (not shown in the figures) in which a bolt is fastened is formed in the coupled part F1.

The stirring pin F2 extends downward from the coupled part F1 and is coaxial with the coupled part F1. The stirring pin F2 is tapered as the portion of the stirring pin F2 is further away from the coupled part F1. As shown in FIG. 4, the distal end face F3, which is perpendicular to the rotation center axis C and is flat, is formed at the distal end of the stirring pin F2. That is, the outer surface of the stirring pin F2 is constituted by a tapered outer peripheral surface and the distal end face F3 formed at the distal end. In a side view, an inclination angle α formed by the rotation center axis C and the outer peripheral surface of the stirring pin F2 only may be set as appropriate in a range of, for example, 5° to 30°. Meanwhile, in this embodiment, the inclination angle α is set to be the same as the inclination angle β of the step side surface 12b.

The stirring pin F2 has a spiral groove engraved on the outer peripheral surface thereof. In this embodiment, since the rotary tool F is rotated to the right, the spiral groove is formed counterclockwise from the proximal end toward the distal end. In other words, if the spiral groove is traced from the proximal end to the distal end, the spiral groove is formed counterclockwise when viewed from above.

Note that, when the rotary tool F is rotated to the left, it is desirable to form the spiral groove clockwise from the proximal end toward the distal end. In other words, if the spiral groove is traced from the proximal end toward the distal end, the spiral groove in this case is formed clockwise when viewed from above. By setting the spiral groove in this way, metal plastically fluidized in friction stir is guided to the distal end side of the stirring pin F2 by the spiral groove. Consequently, it is possible to reduce an amount of the metal overflowing to the outside of a joined metal member (the jacket main body 2 and the seal body 3).

As shown in FIG. 3, when friction stir is preformed using the rotary tool F, only the stirring pin F2 rotated clockwise is inserted into the seal body 3. The seal body 3 and the coupled part F1 are moved while being apart from each other. In other words, the friction stir is performed while the proximal end part of the stirring pin F2 is exposed. The frictionally stirred metal hardens, whereby a plasticized region W1 is formed in a moving track of the rotary tool F. In this embodiment, the stirring pin is inserted into a start position Sp set in the seal body 3. The rotary tool F is relatively moved clockwise with respect to the seal body 3.

As shown in FIG. 4, in the main joining step, only the stirring pin F2 is brought into contact with only the seal body 3 and turned around along the first butt portion J1. In this embodiment, an insertion depth is set to prevent the distal end face F3 of the stirring pin F2 from coming into contact with the jacket main body 2. "A state in which only the stirring pin F2 is brought into contact with only the seal body 3" refers to a state in which the outer surface of the stirring pin F2 is not brought into contact with the jacket main body 2 while the friction stir is performed. The state can also include a state in which the distance between the outer peripheral surface of the stirring pin F2 and the step side surface 12b is zero or a state in which the distance between the distal end face F3 of the stirring pin F2 and the step bottom surface 12a is zero.

If the distance from the step side surface 12b to the outer peripheral surface of the stirring pin F2 is too long, joining strength of the first butt portion J1 decreases. A interval of distance L from the step side surface 12b to the outer peripheral surface of the stirring pin F2 only may be set as appropriate according to the materials of the jacket main body 2 and the seal body 3. Meanwhile, when the outer peripheral surface of the stirring pin F2 is not brought into contact with the step side surface 12b and the distal end face F3 is not brought into contact with the step bottom surface 12a as in this embodiment, for example, it is desirable to set the interval of distance L to 0≤L≤0.5 mm and, desirably, to 0≤L≤0.3 mm.

Figure 5:
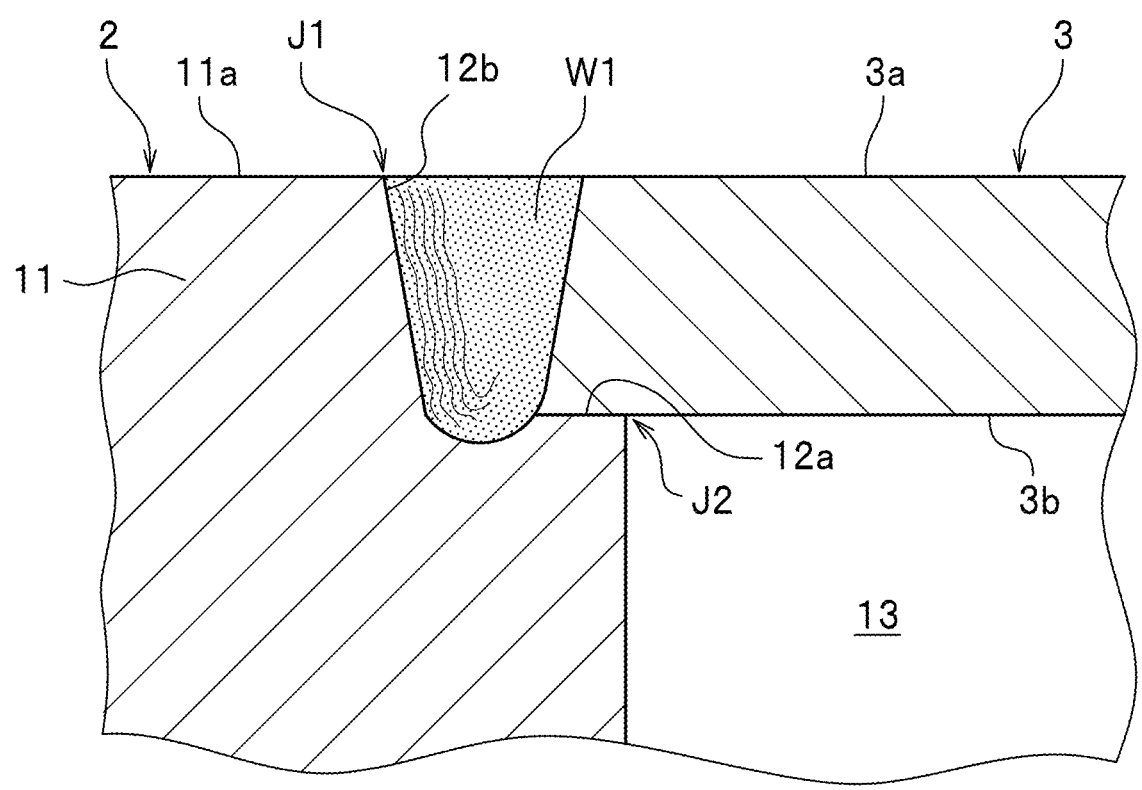
FIG. 5 is a sectional view showing a joined part after the main joining step of the method for manufacturing the liquid-cooled jacket according to the first embodiment.

After the rotary tool F is turned around the seal body 3, the start end and the terminal end of the plasticized region W1 coincide with each other. The rotary tool F may be gradually lifted and pulled out from the front surface 3a of the seal body 3. FIG. 5 is a sectional view of a joined part after the main joining step according to this embodiment. The plasticized region W1 is formed on the seal body 3 side across the first butt portion J1. The distal end face F3 of the stirring pin F2 is not brought into contact with the step bottom surface 12a (see FIG. 4). The plasticized region W1 is formed to extend over the second butt portion J2 and reach the jacket main body 2.

With the method for manufacturing a liquid-cooled jacket according to this embodiment explained above, the stirring pin F2 of the rotary tool F and the step side surface 12b are not brought into contact with each other. Meanwhile, the second aluminum alloy on the seal body 3 side of the first butt portion J1 is mainly stirred and plastically fluidized by frictional heat of the seal body 3 and the stirring pin F2. The step side surface 12b and the side surface 3c of the seal body 3 can be joined in the first butt portion J1. Since only the stirring pin F2 is brought into contact with only the seal body 3 and the friction stir is performed, the first aluminum alloy is hardly mixed in the seal body 3 from the jacket main body 2. Consequently, in the first butt portion J1, the second aluminum alloy on the seal body 3 side is mainly frictionally stirred. This prevents deterioration in the joining strength.

The step side surface 12b of the jacket main body 2 is inclined outside, and this inclination facilitates avoiding contact of the stirring pin F2 to the jacket main body 2. In this embodiment, the inclination angle β of the step side surface 12b and the inclination angle α of the stirring pin F2 are set the same (the step side surface 12b and the outer peripheral surface of the stirring pin F2 are set in parallel). This makes it possible to set the stirring pin F2 and the step side surface 12b as close as possible while avoiding contact of the stirring pin F2 to the step side surface 12b.

While only the stirring pin F2 is brought into contact with only the seal body 3, the friction stir welding is performed. This makes it possible to eliminate imbalance of material resistances received by the stirring pin F2 on one side and the other side with respect to the rotation center axis C of the stirring pin F2. Consequently, a plastic flow material is frictionally stirred in a well-balanced state, which prevents the joining strength from deteriorating.

In the main joining step, a rotating direction and a traveling direction of the rotary tool F only may be set as appropriate. Meanwhile, the rotating direction and the traveling direction of the rotary tool F are set such that, in the plasticized region W1 formed in the moving track of the rotary tool F, the jacket main body 2 side is a shear side and the seal body 3 side is a flow side. Consequently, even if a tunnel-like void defect due to the friction stir occurs, the void defect is formed in a part far from a hollow part of the liquid-cooled jacket 1, which improves watertightness and airtightness. Setting the jacket main body 2 side as the shear side enhances stirring action by the stirring pin F2 around the first butt portion J1, which allows temperature rise in the first butt portion J1 to be expected. This further secures joining of the step side surface 12b and the side surface 3c of the seal body 3 in the first butt portion J1.

Note that, the shear side (an advancing side) means a side where relative speed of the outer periphery of the rotary tool with respect to the joined part has a value obtained by adding the magnitude of moving speed to the magnitude of tangential speed in the outer periphery of the rotary tool. On the other hand, the flow side (a retreating side) means a side where the rotary tool turns in the opposite direction of the moving direction of the rotary tool, whereby the relative speed of the rotary tool with respect to the joined part decreases.

The first aluminum alloy of the jacket main body 2 is a material having hardness higher than the hardness of the second aluminum alloy of the seal body 3. Consequently, it is possible to improve durability of the liquid-cooled jacket 1. It is desirable to use an aluminum alloy cast material as the first aluminum alloy of the jacket main body 2 and use an aluminum alloy wrought material as the second aluminum alloy of the seal body 3. By using an Al—Si—Cu-based aluminum alloy cast material such as JISH5302 ADC12 as the first aluminum alloy, it is possible to improve castability, strength, machinability, and the like of the jacket main body 2. Use of, for example, a JIS A1000 series or A6000 series aluminum alloy as the second aluminum alloy improves workability and thermal conductivity.

In this embodiment, the distal end face F3 of the stirring pin F2 is not inserted more deeply than the step bottom surface 12a. Meanwhile, the joining strength is improved by allowing the plasticized region W1 to reach the second butt portion J2.

<First Modification>

Figure 6:
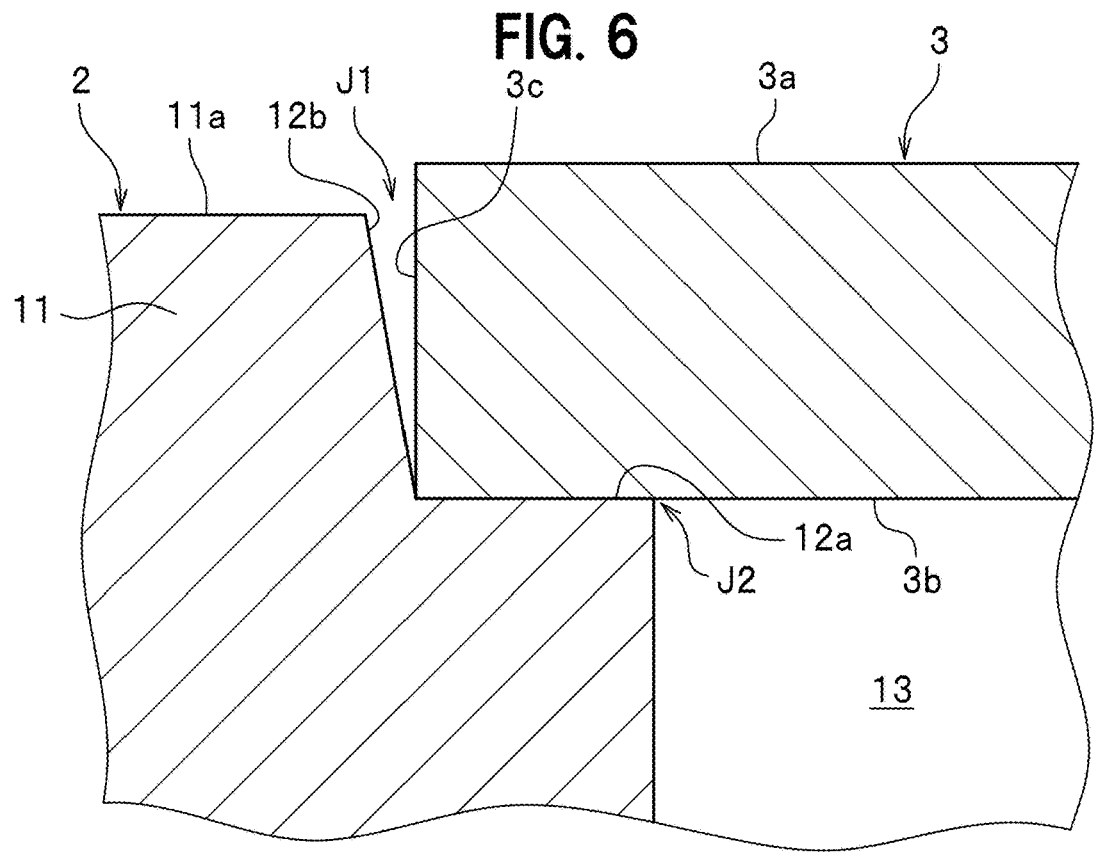
FIG. 6 is a sectional view showing a mounting step of a method for manufacturing a liquid-cooled jacket according to a first modification of the first embodiment.

A first modification of the first embodiment is explained. As in the first modification shown in FIG. 6, the plate thickness of the seal body 3 may be set larger than the height dimension of the step side surface 12b. Since the first butt portion J1 is formed with a gap, metal shortage is likely to occur in the joined part. Meanwhile, the metal shortage is supplemented by setting the plate thickness of the seal body 3 as in the first modification.

<Second Modification>

Figure 7:
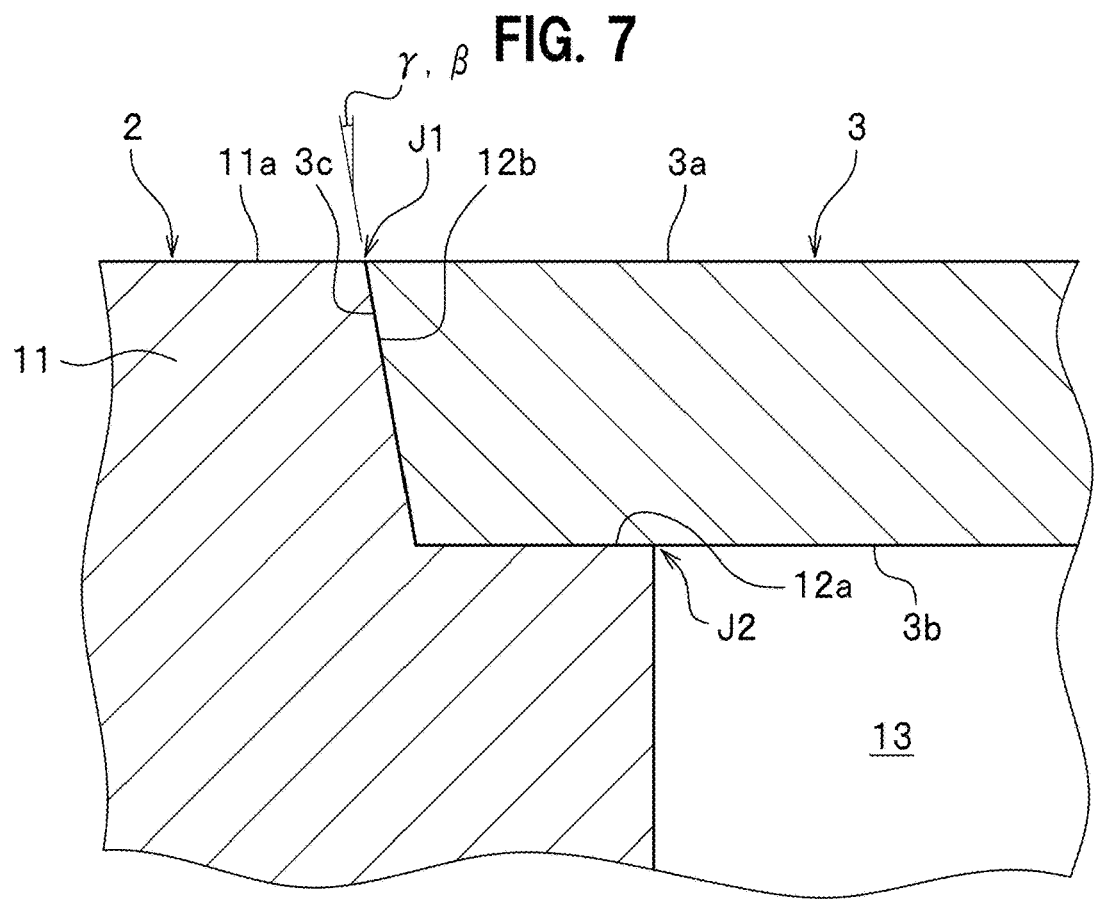
FIG. 7 is a sectional view showing a mounting step of a method for manufacturing a liquid-cooled jacket according to a second modification of the first embodiment.

A second modification of the first embodiment is explained. The side surface 3c of the seal body 3 may be inclined to provide an inclined surface as in the second modification shown in FIG. 7. The side surface 3c is inclined outside as extending from the back surface 3b to the front surface 3a. An inclination angle γ of the side surface 3c is the same as the inclination angle β of the step side surface 12b. Consequently, in the mounting step, the step side surface 12b and the side surface 3c of the seal body 3 come into surface contact with each other. According to the second modification, a gap is not formed in the first butt portion J1, which makes it possible to supplement the metal shortage of the joined part.

Second Embodiment

A method for manufacturing a liquid-cooled jacket according to a second embodiment of the present invention is explained. In the method for manufacturing a liquid-cooled jacket according to the second embodiment, a preparation step, a mounting step, and a main joining step are performed. The preparation step and the mounting step of the method for manufacturing a liquid-cooled jacket according to the second embodiment are equivalent to the preparation step and the mounting step in the first embodiment. Therefore, explanation of the preparation step and the mounting step is omitted. In the second embodiment, differences from the first embodiment are mainly explained.

Figure 8:
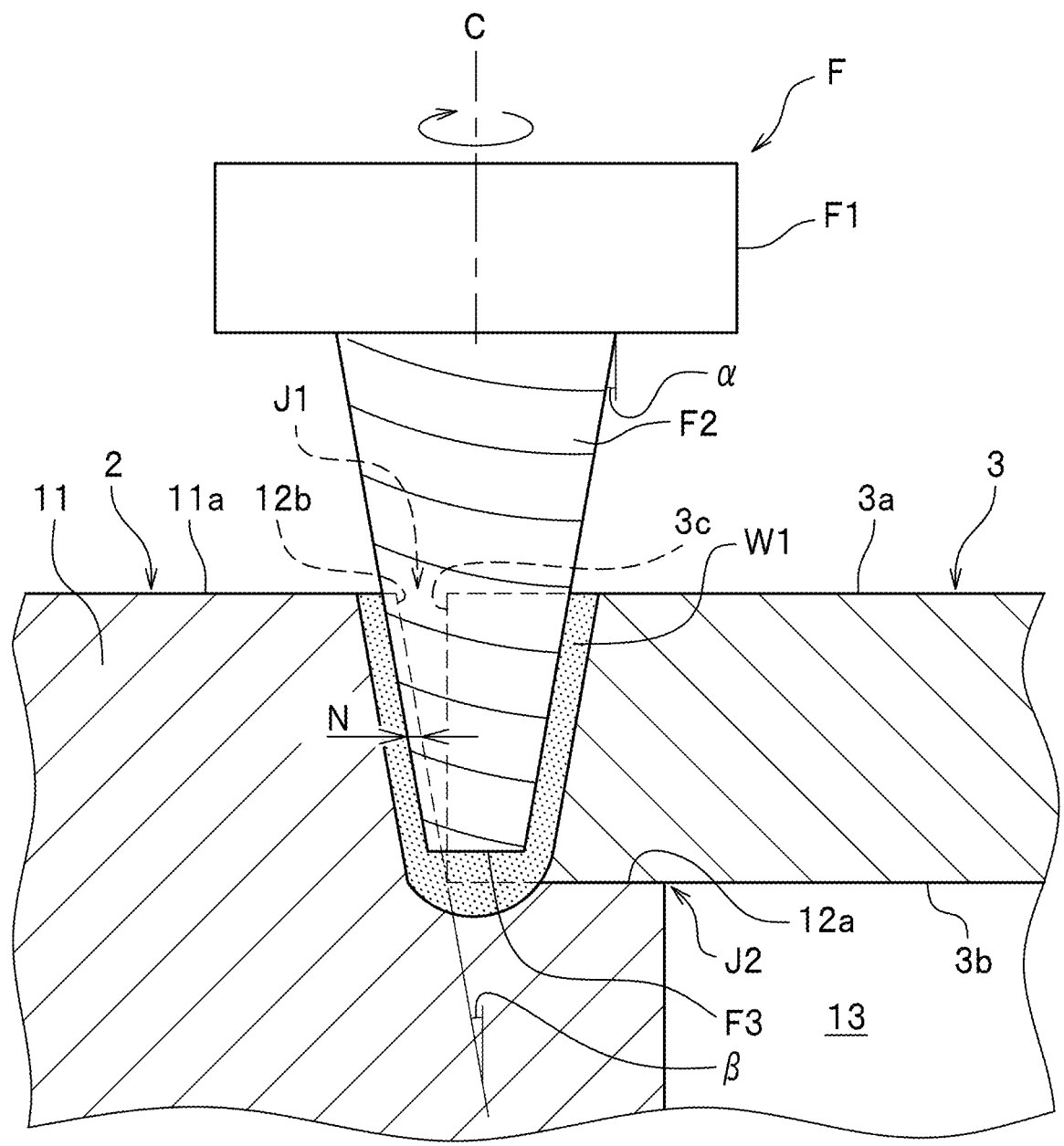
FIG. 8 is a sectional view showing a main joining step of a method for manufacturing a liquid-cooled jacket according to a second embodiment of the present invention.

As shown in FIG. 8, the main joining step is a step of frictionally stir-welding the jacket main body 2 and the seal body 3 using the rotary tool F. In the main joining step, when the stirring pin F2 is relatively moved along the first butt portion J1, the friction stir welding is performed while bringing the outer peripheral surface of the stirring pin F2 into slight contact with the step side surface 12b and not bringing the distal end face F3 into contact with the step bottom surface 12a.

A contact margin of the outer peripheral surface of the stirring pin F2 with respect to the step side surface 12b is represented as an offset amount N. When the outer peripheral surface of the stirring pin F2 is brought into contact with the step side surface 12b and the distal end face F3 of the stirring pin F2 is not brought into contact with the step bottom surface 12a as in this embodiment, the offset amount N is set to 0<N≤0.5 mm and, desirably, to 0<N≤0.25 mm.

Figure 24:
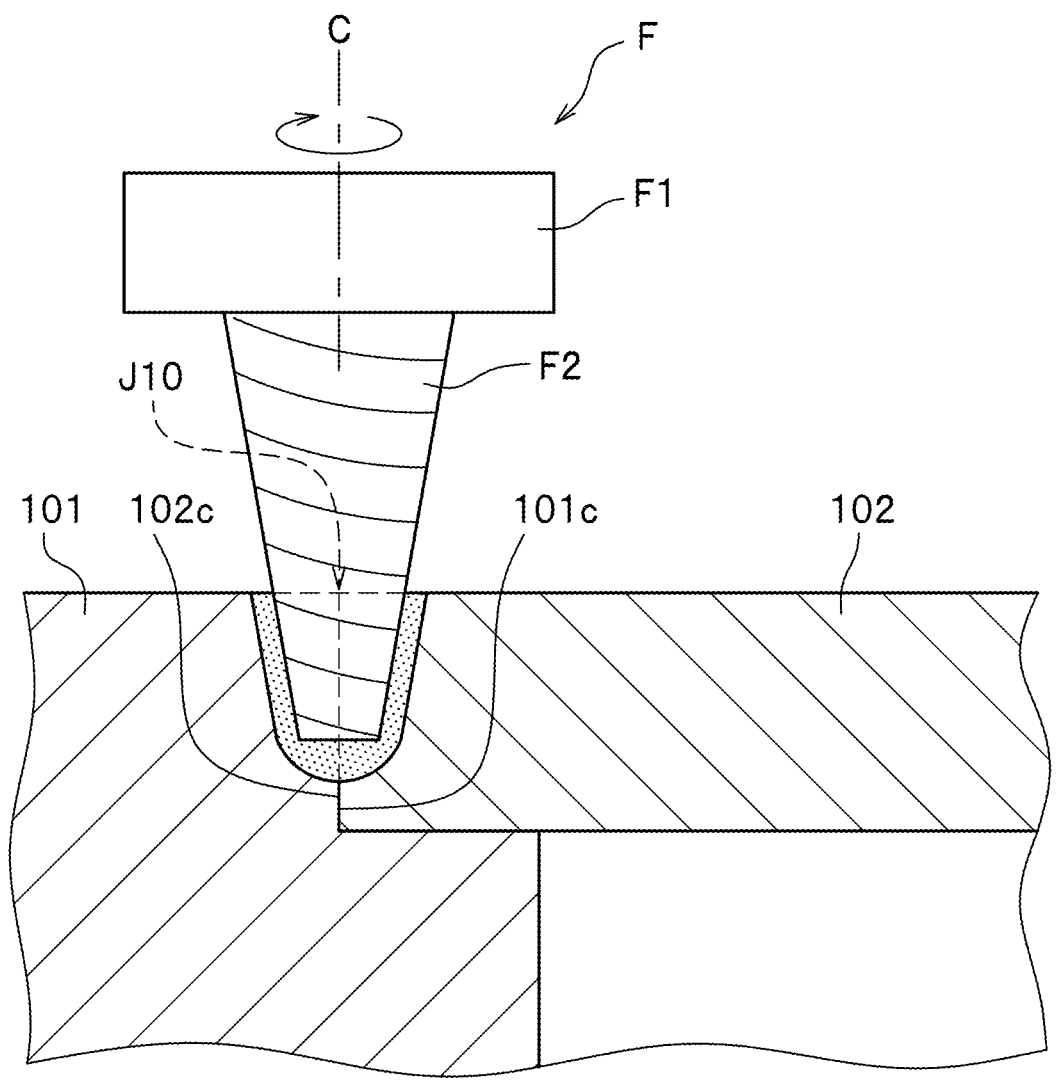
FIG. 24 is a sectional view showing a conventional method for manufacturing a liquid-cooled jacket.

In the conventional method for manufacturing the liquid-cooled jacket shown in FIG. 24, since the hardness of the jacket main body 101 and the hardness of the seal body 102 are different, material resistances received by the stirring pin F2 on one side and the other side across the rotation center axis C are also greatly different. Therefore, the plastic flow material is not stirred in a well-balanced state. This is a factor of the deterioration in the joining strength. Meanwhile, according to this embodiment, the contact margin of the outer peripheral surface of the stirring pin F2 and the jacket main body 2 is set as small as possible. This makes it possible to reduce material resistance received by the stirring pin F2 from the jacket main body 2 as much as possible. In this embodiment, the inclination angle β of the step side surface 12b and the inclination angle α of the stirring pin F2 are set the same (the step side surface 12b and the outer peripheral surface of the stirring pin F2 are set in parallel). Therefore, it is possible to set the contact margin of the stirring pin F2 and the step side surface 12b uniform over the height direction. Consequently, in this embodiment, the plastic flow material is stirred in a well-balanced state, which prevents the deterioration in the strength of the joined part.

Note that, in the second embodiment, as in the first modification and the second modification of the first embodiment, the plate thickness of the seal body 3 may be increased or an inclined surface may be provided on the side surface.

Third Embodiment

A method for manufacturing a liquid-cooled jacket according to a third embodiment of the present invention is explained. The method for manufacturing a liquid-cooled jacket according to the third embodiment includes a preparation step, a mounting step, and a main joining step to be performed. The preparation step and the mounting step of the method for manufacturing a liquid-cooled jacket according to the third embodiment are equivalent to the preparation step and the mounting step in the first embodiment. Therefore, explanation of the preparation step and the mounting step is omitted. In the third embodiment, differences from the first embodiment are mainly explained.

Figure 9:
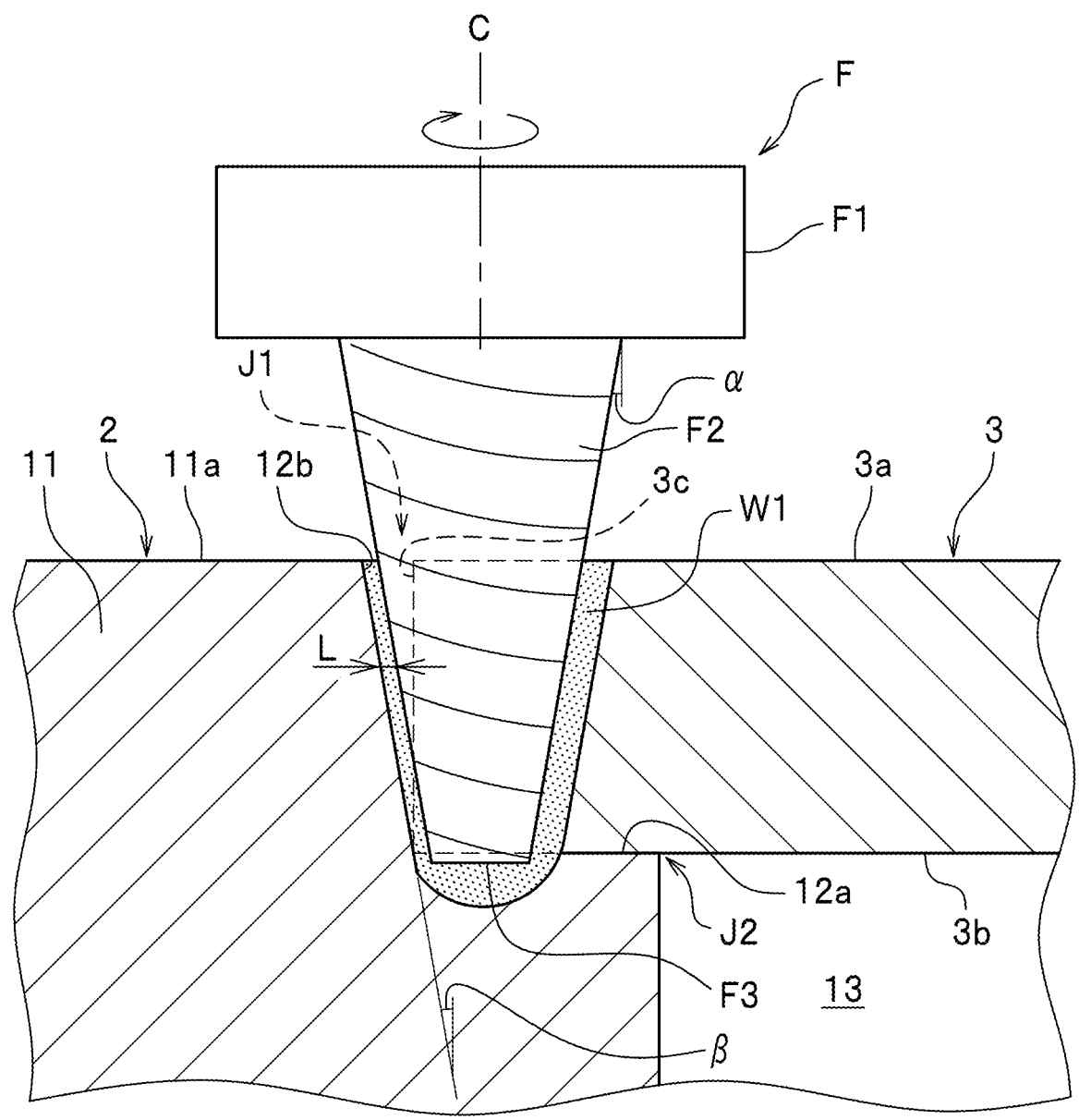
FIG. 9 is a sectional view showing a main joining step of a method for manufacturing a liquid-cooled jacket according to a third embodiment of the present invention.

As shown in FIG. 9, the main joining step is a step of frictionally stir-welding the jacket main body 2 and the seal body 3 using the rotary tool F. In the main joining step, while the stirring pin F2 is relatively moved along the first butt portion J1, the friction stir welding is performed while the outer peripheral surface of the stirring pin F2 is not brought into contact with the step side surface 12b and the distal end face F3 is inserted more deeply than the step bottom surface 12a.

With the method for manufacturing a liquid-cooled jacket according to this embodiment, the stirring pin F2 and the step side surface 12b are not brought into contact with each other. Meanwhile, the second aluminum alloy on the seal body 3 side of the first butt portion J1 is mainly stirred and plastically fluidized by frictional heat of the seal body 3 and the stirring pin F2. The step side surface 12b and the side surface 3c of the seal body 3 can be joined in the first butt portion J1. Only the stirring pin F2 is brought into contact with only the seal body 3 and the friction stir is performed in the first butt portion J1. Therefore, the first aluminum alloy is hardly mixed in the seal body 3 from the jacket main body 2. Consequently, the second aluminum alloy on the seal body 3 side is mainly frictionally stirred in the first butt portion J1. This prevents the deterioration in the joining strength.

The step side surface 12b of the jacket main body 2 is inclined outside, which facilitates avoiding contact of the stirring pin F2 to the step side surface 12b. In this embodiment, the inclination angle β of the step side surface 12b and the inclination angle α of the stirring pin F2 are set the same (the step side surface 12b and the outer peripheral surface of the stirring pin F2 are set in parallel). This makes it possible to set the stirring pin F2 and the step side surface 12b as close as possible while avoiding contact of the stirring pin F2 to the step side surface 12b.

The outer peripheral surface of the stirring pin F2 is separated from the step side surface 12b and the friction stir welding is performed. This makes it possible to reduce imbalance of material resistances received by the stirring pin F2 on one side and the other side with respect to the rotation center axis C of the stirring pin F2. Consequently, the plastic flow material is frictionally stirred in a well-balanced state, which prevents the deterioration in the joining strength. When the outer peripheral surface of the stirring pin F2 is not brought into contact with the step side surface 12b and the distal end face F3 is inserted more deeply than the step bottom surface 12a as in this embodiment, for example, it is desirable to set the interval of distance L to mm and, desirably, to 0≤L≤0.3 mm.

Inserting the distal end face F3 of the stirring pin F2 into the step bottom surface 12a makes it possible to more securely frictionally stir a lower part of the joined part. This prevents a void defect or the like from occurring in the plasticized region W1 and improves the joining strength. The entire distal end face F3 of the stirring pin F2 is located further on the center side of the seal body 3 than the side surface 3c of the seal body 3. Consequently, a joining region of the second butt portion J2 is increased, which improves the joining strength.

Note that, in the third embodiment, as in the first modification and the second modification of the first embodiment, the plate thickness of the seal body 3 may be increased or an inclined surface may be provided on the side surface.

Fourth Embodiment

A method for manufacturing a liquid-cooled jacket according to a fourth embodiment of the present invention is explained. In the method for manufacturing a liquid-cooled jacket according to the fourth embodiment, a preparation step, a mounting step, and a main joining step are performed. The preparation step and the mounting step of the method for manufacturing a liquid-cooled jacket according to the fourth embodiment are equivalent to the preparation step and the mounting step in the first embodiment. Therefore, explanation of the preparation step and the mounting step is omitted. In the fourth embodiment, differences from the third embodiment are mainly explained.

Figure 10:
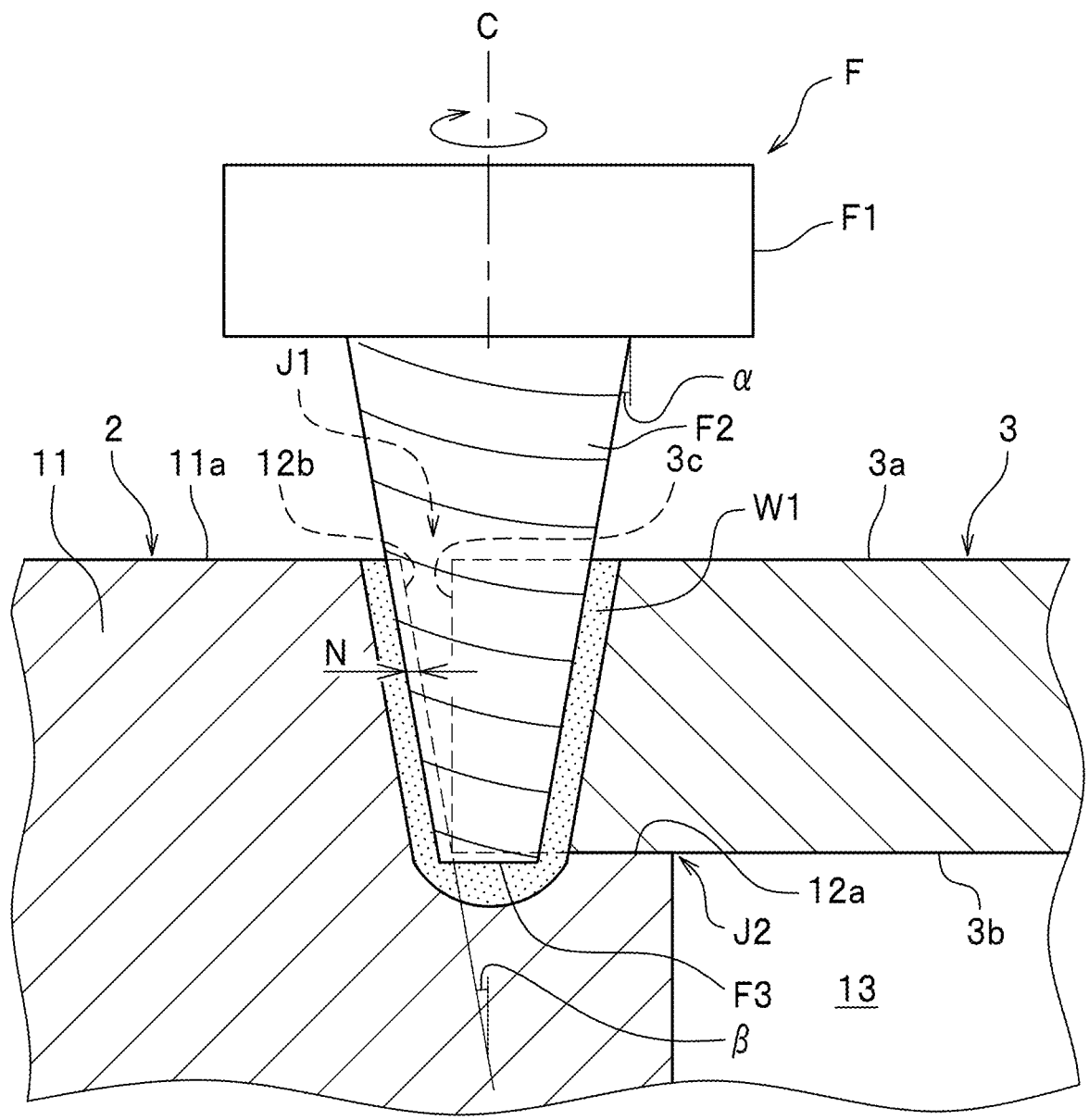
FIG. 10 is a sectional view showing a main joining step of a method for manufacturing a liquid-cooled jacket according to a fourth embodiment of the present invention.

As shown in FIG. 10, the main joining step is a step of frictionally stir-welding the jacket main body 2 and the seal body 3 using the rotary tool F. In the main joining step, when the stirring pin F2 is relatively moved along the first butt portion J1, the friction stir welding is performed by bringing the outer peripheral surface of the stirring pin F2 into slight contact with the step side surface 12b and inserting the distal end face F3 more deeply than the step bottom surface 12a.

A contact margin of the outer peripheral surface of the stirring pin F2 with respect to the step side surface 12b is represented as an offset amount N. When the distal end face F3 of the stirring pin F2 is inserted more deeply than the step bottom surface 12a and the outer peripheral surface of the stirring pin F2 is brought into contact with the step side surface 12b, the offset amount N is set to $0<N\leq1.0$ mm, desirably, to $0<N\leq0.85$ mm, and, more desirably, to $0<N\leq0.65$ mm.

In the conventional method for manufacturing the liquid-cooled jacket shown in FIG. 24, the hardness of the jacket main body 101 and the hardness of the seal body 102 are different, and material resistances received by the stirring pin F2 on one side and the other side across the rotation center axis C are also greatly different. Therefore, the plastic flow material is not stirred in a well-balanced state. This is a factor of the deterioration in the joining strength. Meanwhile, according to this embodiment, the contact margin of the outer peripheral surface of the stirring pin F2 and the jacket main body 2 is set as small as possible. This makes it possible to reduce material resistance received by the stirring pin F2 from the jacket main body 2 as much as possible. In this embodiment, the inclination angle $\beta$ of the step side surface 12b and the inclination angle $\alpha$ of the stirring pin F2 are set the same (the step side surface 12b and the outer peripheral surface of the stirring pin F2 are set in parallel). This makes it possible to set the contact margin of the stirring pin F2 and the step side surface 12b uniform over the height direction. Consequently, in this embodiment, the plastic flow material is stirred in a well-balanced state, which prevents the deterioration in the strength of the joined part.

Inserting the distal end face F3 of the stirring pin F2 into the step bottom surface 12a makes it possible to more securely frictionally stir the lower part of the joined part. This prevents a void defect or the like from occurring in the plasticized region W1 and improves the joining strength. That is, it is possible to firmly join both of the first butt portion J1 and the second butt portion J2.

Note that, in the fourth embodiment, as in the first modification and the second modification of the first embodiment, the plate thickness of the seal body 3 may be increased or an inclined surface may be provided on the side surface.

First Modification of the Fourth Embodiment

Figure 11:
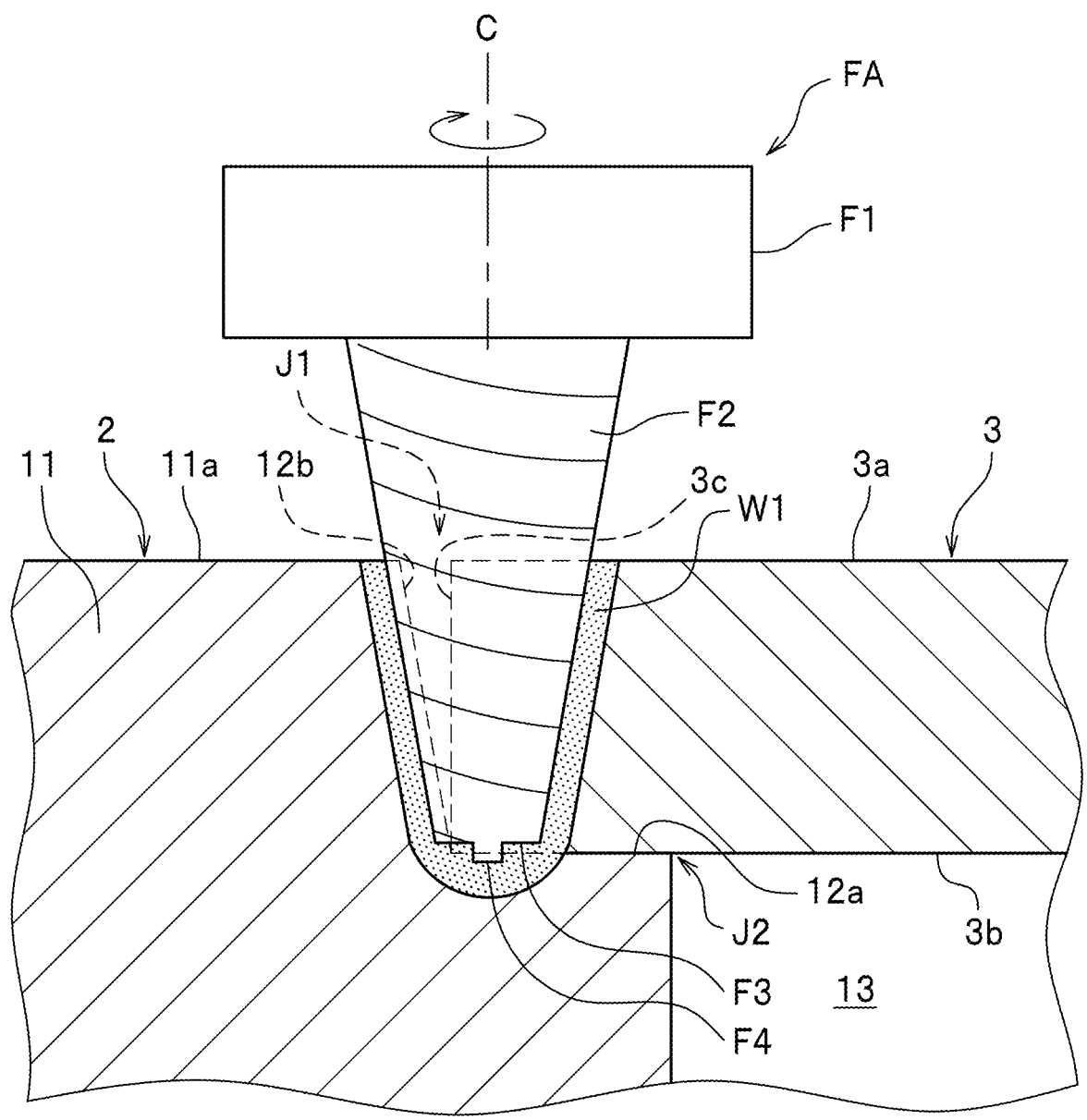
FIG. 11 is a sectional view showing a main joining step of a method for manufacturing a liquid-cooled jacket according to a first modification of the fourth embodiment.

A first modification of the fourth embodiment is explained. As shown in FIG. 11, the first modification is different from the fourth embodiment in that a rotary tool FA is used. In the modification, differences from the fourth embodiment are mainly explained.

The rotary tool FA used in the main joining step includes the coupled part F1 and the stirring pin F2. The distal end face F3, which is perpendicular to the rotation center axis C and is flat, is formed at the distal end of the stirring pin F2. A protrusion part F4 is formed on the distal end face F3 of the stirring pin F2. The protrusion part F4 is a part projecting downward from the distal end face F3. The shape of the protrusion part F4 is not particularly limited. In this embodiment, the protrusion part F4 is columnar. A step part is formed by the side surface of the protrusion part F4 and the distal end face F3.

In the main joining step in the first modification, the protrusion part F4 is inserted more deeply than the step bottom surface 12a. The distal end face F3 is located above the second butt portion J2. The plastic flow material frictionally stirred and blown up by the protrusion part F4 is pressed by the distal end face F3. Consequently, the periphery of the protrusion part F4 is more securely frictionally stirred. The oxide film of the second butt portion J2 is securely separately broken. This improves the joining strength of the second butt portion J2. Setting only the protrusion part F4 to be inserted more deeply than the second butt portion J2 as in the modification reduces the width of the plasticized region W1 compared with when the distal end face F3 is inserted more deeply than the second butt portion J2. This prevents the plastic flow material from flowing out to the recessed part 13 and makes it possible to set the width of the step bottom surface 12a small.

Note that, in the first modification of the fourth embodiment shown in FIG. 11, the protrusion part F4 (the distal end of the stirring pin F2) is set to be inserted more deeply than the second butt portion J2. Meanwhile, the distal end face F3 may be set to be inserted more deeply than the second butt portion J2.

EXAMPLE

An example of the present invention is explained. In the example, the friction stir welding was performed mainly using conditions such as rotating speed and joining speed of the stirring pin F2, presence or absence of inclination of the side surface of the seal body, and the offset amount N as parameters. Macro cross sections of joined parts (the plasticized region) were observed to confirm a joining state and a tensile test was performed. In the example, four kinds of tests (hereinafter referred to as "first test", "second test", "third test", and "fourth test") were performed.

<First Test>

Figure 12:
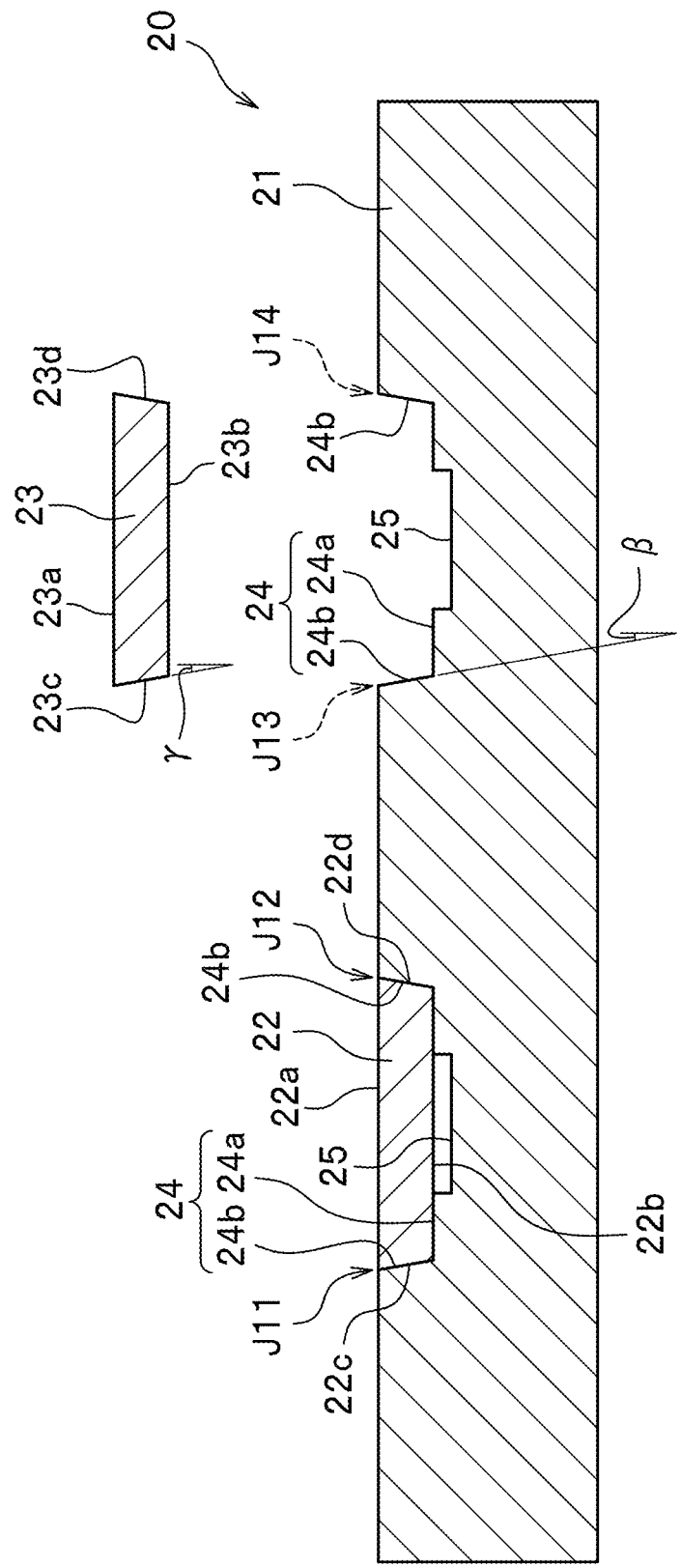
FIG. 12 is a sectional view showing a test body of a first test according to an example.
Figure 13:
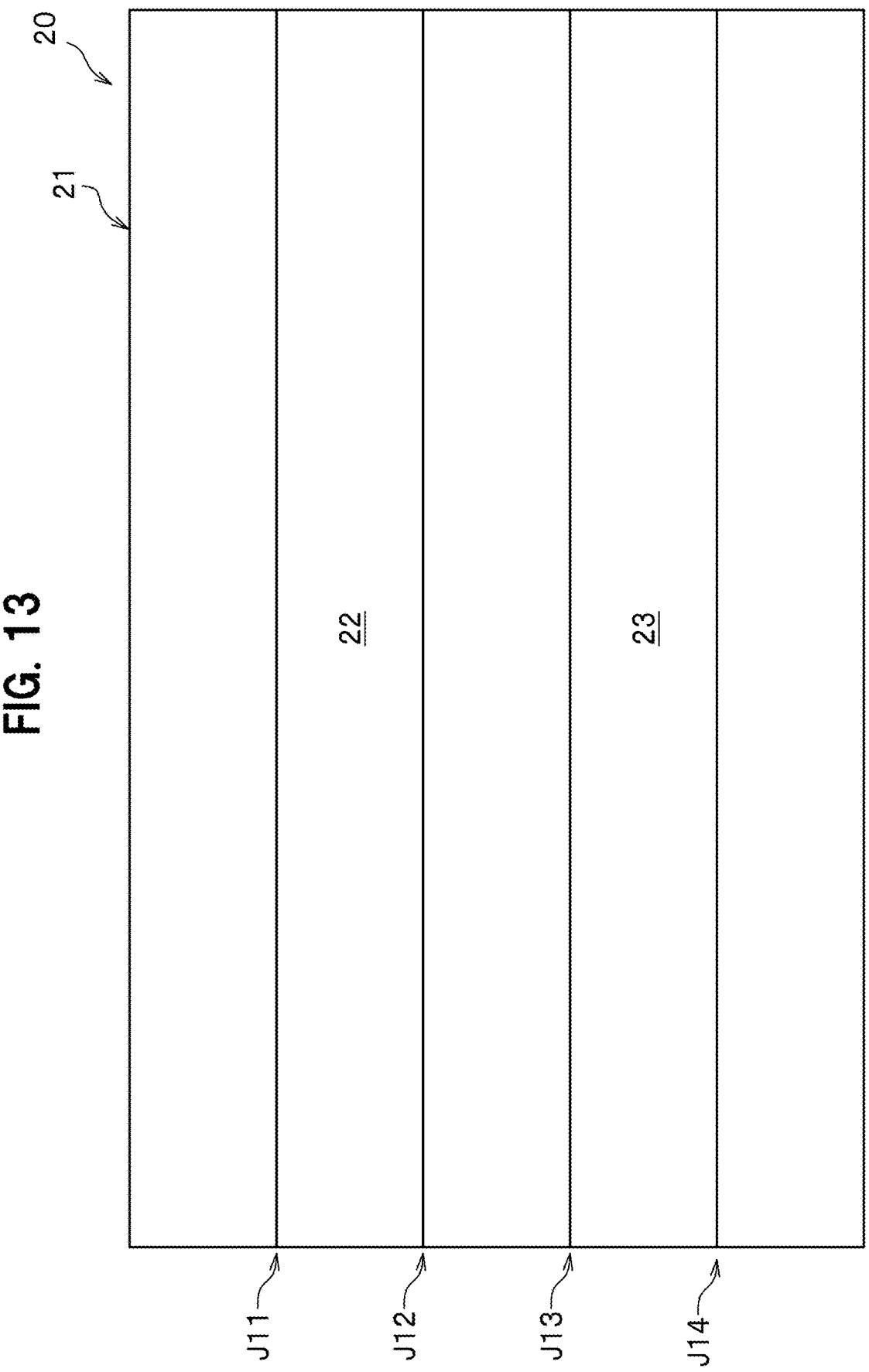
FIG. 13 is a plan view showing the test body of the first test according to the example.

In the first test, the test was performed using a test body 20 shown in FIG. 12 and FIG. 13. The test body 20 is configured by a base member 21, a seal body 22, and a seal body 23. As the base member 21, an aluminum alloy cast material: ADC12 (JISH5302 Al—Si—Cu-based) was used. As the seal bodies 22 and 23, an aluminum alloy wrought material: JIS A1050 was used. The base material 21 has high hardness compared with the seal bodies 22 and 23. Step parts 24, 24 are formed in the base member 21. The step part 24 is constituted by a step bottom surface 24a and step side surfaces 24b, 24b obliquely inclined outside from the step bottom surface 24a. Side surfaces 22c and 22d of the seal body 22 are inclined outside. Both of inclination angles β of the step side surfaces 24b, 24b with respect to the vertical plane are 10°. A groove part 25 is formed in the center of the step bottom surface 24a. Both of the depth of the step part 24 and the plate thickness of the seal body 22 are 3.0 mm. The inclination angle γ of the side surfaces 22c and 22d of the seal body 22 and side surfaces 23c and 23d of the seal body 23 are 10° with respect to the vertical plane.

Figure 14:
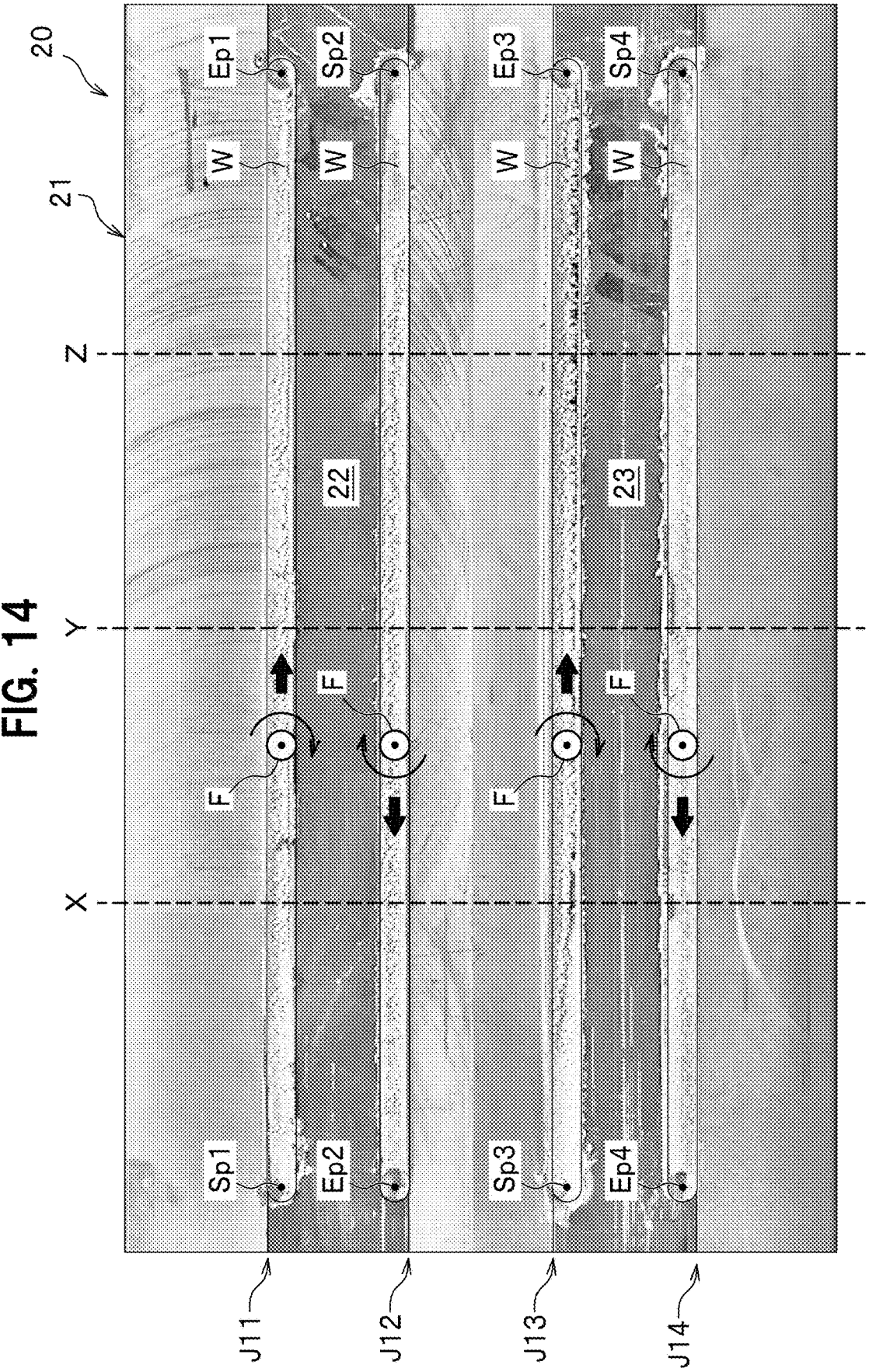
FIG. 14 is a plan view showing a test method of the first test according to the example.

As shown in FIG. 12 and FIG. 13, by mounting the seal body 22 on one step part 24, a butt portion J11 and a butt portion J12 are formed. The back surface 22b of the seal body 22 comes into surface contact with the step bottom surface 24a. The front surface 22a of the seal body 22 becomes flush with the front surface of the base member 21. Mounting the seal body 23 on the other step part 24 forms a butt portion J13 and a butt portion J14. The back surface 23b of the seal body 23 comes into surface contact with the step bottom surface 24a. The front surface 23a of the seal body 23 becomes flush with the surface of the base member 21. In the first test, as shown in FIG. 14, the friction stir welding was performed respectively on the butt portions J11 to J14 using the rotary tool F. As the rotary tool F, a rotary tool having the same shape as the shape of the rotary tool F shown in FIG. 4 was used. Joining speed (feeding speed) of the rotary tool F was set to 700 mm/minute for all of the butt portions J11 to J14. In all of the butt portions J11 to J14, the distal end face F3 of the rotary tool F was not brought into contact with the step bottom surface 24a.

As shown in FIG. 14, in the butt portion J11 (trial NO. 1), the rotary tool F rotated to the right was inserted into a start position Sp1 set on one end side of the seal body 22. The rotary tool F was relatively moved along the butt portion J11 while the rotary tool F was brought into contact with only the seal body 22. The rotary tool F was released in an end position Ep1 set on the other end side. The number of revolutions of the rotary tool F was set to 5000 rpm. The offset amount N was set to 0.0 mm (the rotary tool F and the base member 21 were not brought into contact with each other).

In the butt portion J12 (trial NO. 2), the rotary tool F was rotated to the right was inserted into a start position Sp2 set on the other end side of the seal body 22. The rotary tool F was relatively moved along the butt portion J12 and released in an end position Ep2 set on one end side. The number of revolutions of the rotary tool F was set to 5000 rpm. The offset amount N was set to 0.25 mm.

In the butt portion J13 (trial NO. 3), the rotary tool F rotated to the right was inserted into a start part Sp3 set on one end side of the seal body 23. The rotary tool F was relatively moved along the butt portion J13 and released in an end position Ep3 set on the other end side. The number of revolutions of the rotary tool F was set to 5000 rpm. The offset amount N was set to 0.50 mm.

In the butt portion J14 (trial NO. 4), the rotary tool F rotated to the right is inserted into a start position Sp4 set on the other end side of the seal body 22. The rotary tool F was relatively moved along the butt portion J14 and released in an end position Ep4 set on one end side. The number of revolutions of the rotary tool F was set to 7000 rpm. The offset amount N was set to 0.25 mm.

Note that an "X point", a "Y point", and a "Z point" shown in FIGS. 15 to 17 correspond to positions X, Y, and Z shown in FIG. 14.

As in the trial NO. 3 shown in FIG. 15, it is seen that, when the offset amount N is large, a large number of burrs occur on the surface compared with the trial NOs. 1 and 2. As shown in FIG. 16 and FIG. 17, it is seen that, in all of the trial NOs. 1 to 4, all of the butt portions J11 to J14 are satisfactorily joined without voids. On the other hand, in all of the trial NOs. 1 to 4, voids are found here and there in a lower part of the plasticized region W. When the offset amount N increases as in the trial NO. 3, although the butt portion J13 is joined, there is a tendency that a void on the inside of the plasticized region W also increases in size and a recessed groove formed on the surface also increases in size.

As shown in FIG. 16, tensile strength of the trial NO. 1 was 278 N/mm and tensile strength of the trial NO. 2 was 283 N/mm. As shown in FIG. 17, tensile strength of the trial NO. 3 was 75 N/mm and tensile strength of the trial NO. 4 was 276 N/mm. In the trial NOs. 1, 2, and 4, the tensile strength satisfies predetermined strength, although a void defect is present in the plasticized region W. On the other hand, in the trial NO. 3, there were large numbers of underfills and voids of the plasticized region W and the tensile strength was extremely low. Note that the tensile strength in this example was calculated by dividing a breaking load (N) by a joined part width (mm).

<Second Test>

In the second test, a base member and a seal body were prepared as in the first test. Friction stir welding was performed on butt portions in two places in substantially the same manner as the first test (trial NOs. 5 and 6 are respectively set for the butt portions in the two places). An inclined surface was provided in the seal body as in the first test. The inclined surface is brought into surface contact with a step side surface. As a rotary tool, as shown in FIG. 11, the rotary tool FA including the protrusion part F4 was used. The protrusion part F4 was inserted more deeply than the step bottom surface 24a. The friction stir welding was performed without bringing the distal end face F3 into contact with the step bottom surface 24a (see FIG. 12).

In the trial NO. 5, the number of revolutions of the rotary tool FA was set to 7500 rpm and the offset amount N was set to 0.25 mm. In the trial NO. 6, the number of revolutions of the rotary tool FA was set to 10000 rpm and the offset amount N was set to 0.25 mm. When the trial NOs. 5 and 6 were performed, joining speed (feed speed) was gradually increased to 300 mm/minute, 500 mm/minute, and 700 mm/minute for each predetermined section.

As shown in FIG. 18, burrs that occurred on the surface were few in both of the trial NOs. 5 and 6. As shown in FIG. 19, in both of the trial NOs. 5 and 6, a joining state of a butt portion (equivalent to the first butt portion) of the step side surface of the step part and the side surface of the seal body was satisfactory because no void was present. A joining state of a butt portion (equivalent to the second butt portion) of the step bottom surface of the step part and the back surface of the seal body was satisfactory because no void was present. When the trial NOs. 5 and 6 are compared, the recessed groove on the surface of the plasticized region W is smaller in the trial NO. 5. In the second test, a difference of the joining speed of the rotary tool FA is considered to not seriously affect the joining state.

Tensile strength in the trial NO. 5 was 318 N/mm in a section where joining speed was 300 mm/minute, 316 N/mm in a section where joining speed was 500 mm/minute, and 318 N/mm in a section where joining speed was 700 mm/minute. All the tensile strengths of the trial NO. 5 were high values.

Tensile strength in the trial NO. 6 was 326 N/mm in a section where joining speed was 300 mm/minute, 327 N/mm in a section where joining speed was 500 mm/minute, and 328 N/mm in a section where joining speed was 700 mm/minute. All the tensile strengths of the trial NO. 6 were also large values. All the results of the trial NO. 6 were better than the results of the trial NO. 5.

<Third Test>

In the third test, a base member and a seal body were prepared as in the first test. Friction stir welding was performed on butt portions in two places in substantially the same manner as the first test (trial NOs. 7 and 8 are respectively set for the butt portions in the two places). As the base member of the third test, an aluminum alloy cast material: ADC12 (JIS H5302 Al—Si—Cu-based) was used. As the seal body, an aluminum alloy wrought material: JIS A1050 was used. In the seal body, since an inclined surface of a side surface was not provided, a gap was formed in a butt portion of a step side surface of a step part and the side surface of the seal body (see FIG. 2). As a rotary tool, as shown in FIG. 11, the rotary tool FA including the protrusion part F4 was used. The protrusion part F4 was inserted more deeply than the step bottom surface 24a. The friction stir welding was performed without bringing the distal end face F3 into contact with the step bottom surface 24a (see FIG. 12). In the third test, joining speed of the rotary tool FA was set to 300 mm/minute. Rotating speed of the rotary tool FA was set to 7500 rpm.

The offset amount N of the trial NO. 7 was gradually increased in three stages of 0.05 mm, 0.25 mm, and 0.45 mm for each predetermined section. The offset amount N of the trial NO. 8 was gradually increased in three stages of 0.65 mm, 0.85 mm, and 1.05 mm for each predetermined section.

Figure 20:
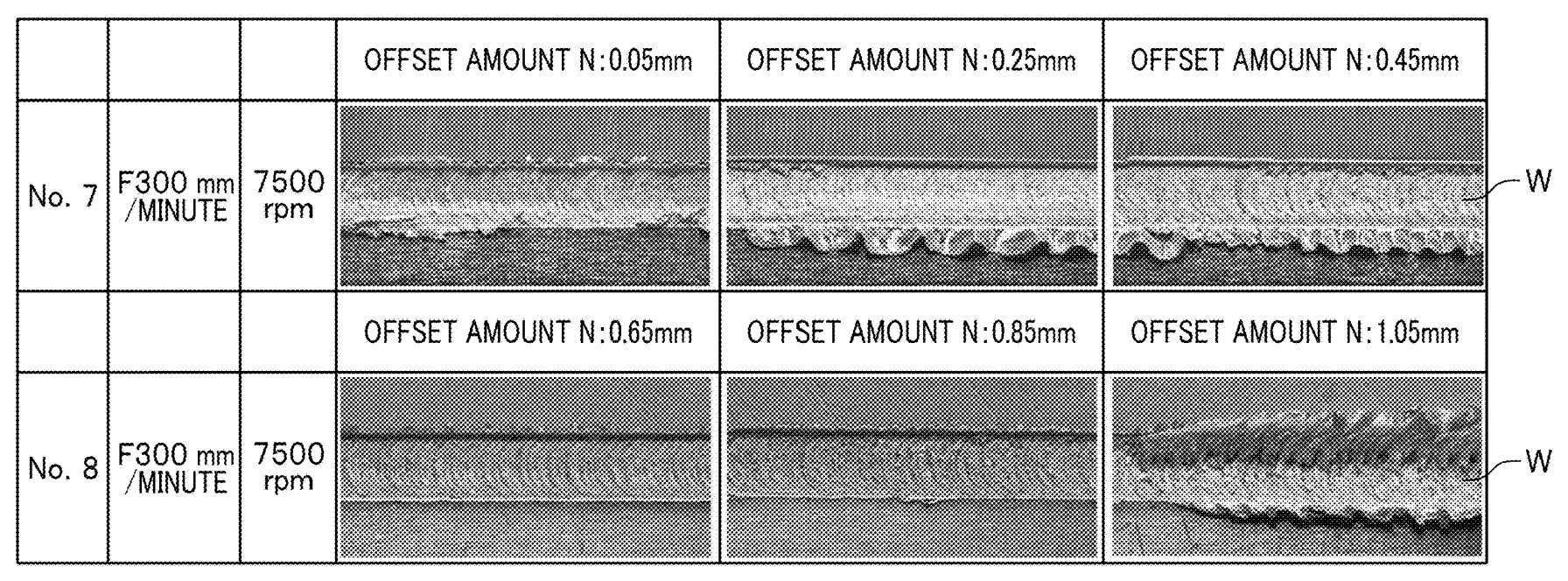

As shown in FIG. 20 and FIG. 21, in the trial NO. 7, a joining state of a butt portion (equivalent to the first butt portion) of the step side surface of the step part and the side surface of the seal body was satisfactory because no void was present. A joining state of a butt portion (equivalent to the second butt portion) of the back surface of the seal body and the step bottom surface of the step part was also satisfactory because no void was present.

Tensile strength in the trial NO. 7 was 255 N/mm in a section where the offset amount N was 0.05 mm, 286 N/mm in a section where the offset amount N was 0.25 mm, and 313 N/mm in a section where the offset amount N was 0.45 mm. All the tensile strengths of the trial NO. 7 were high values.

Tensile strength in the trial NO. 8 was 301 N/mm in a section where the offset amount N was 0.65 mm, 278 N/mm in a section where the offset amount N was 0.85 mm, and 296 N/mm in a section where the offset amount N was 1.05 mm. All the tensile strengths of the trial NO. 8 were high values. The tensile strength was the largest value when the offset amount N was 0.45 mm. When the offset amount N of NO. 8 was 1.05 mm, a value of the tensile strength was large, although there were a large number of underfills.

<Fourth Test>

In the fourth test, a base member and a seal body were prepared as in the first test. Friction stir welding was performed on butt portions in two places in substantially the same manner as the first test (trial NOs. 9 and 10 are respectively set for the butt portions in the two places). As the base member of the fourth test, an aluminum alloy cast material: JISH5302 ADC12 was used. As the seal body, an aluminum alloy wrought material: JIS A6063 was used. In the seal body, since an inclined surface of a side surface was not provided, a gap was formed in a butt portion of a step side surface of a step part and the side surface of the seal body (see FIG. 2). As a rotary tool, as shown in FIG. 11, the rotary tool FA including the protrusion part F4 was used. The protrusion part F4 was inserted more deeply than the step bottom surface 24a. The friction stir welding was performed without bringing the distal end face F3 into contact with the step bottom surface 24a (see FIG. 12). In both of the trial NOs. 9 and 10, the offset amount N was set to 0.25 mm. Joining speed was gradually increased in three stages of 300 mm/minute, 500 mm/minute, and 700 mm/minute for each predetermine section. Rotating speed of the rotary tool FA in the trial NO. 9 was set to 5000 rpm. Rotating speed of the rotary tool FA in the trial NO. 10 was set to 7500 rpm.

Figure 22:
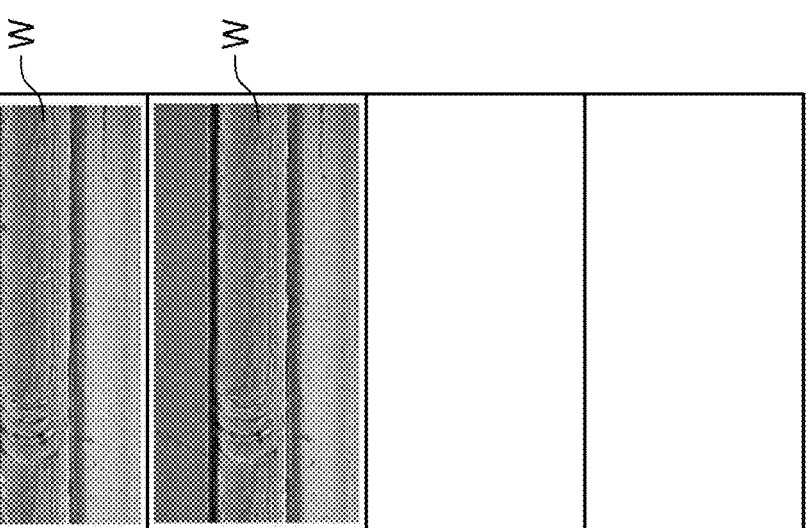
FIG. 22 is a plan view showing a test result of a fourth test according to the example.
Figure 23:
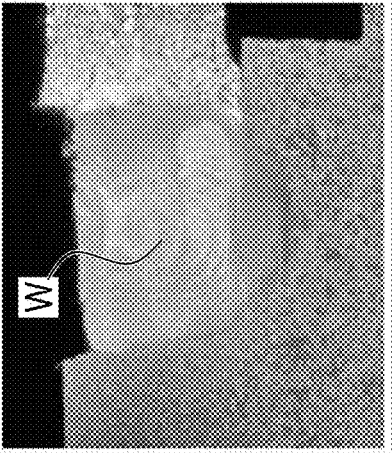
FIG. 23 is a sectional view showing a test result of the fourth test according to the example.

As shown in FIG. 22 and FIG. 23, when the joining speed of the trial NO. 10 was 300 mm/minute, a void defect Q rolled upward from the step bottom surface was formed on the seal body side of the plasticized region W. A joining state was dissatisfactory. That is, the void defect rolled up from the step bottom surface tends to occur when the joining speed of the rotary tool FA is low and the rotating speed of the rotary tool FA is high. Note that, when the joining speed of the trial NO. 10 was 500 mm/minute, the void defect Q was absent and the joining state was satisfactory. Concerning the other conditions of the trial NOs. 9 and 10, a joining state of a butt portion (equivalent to the first butt portion) of the step side surface of the step part and the side surface of the seal body was satisfactory because no void was present. A joining state of a butt portion (equivalent to the second butt portion) of the back surface of the seal body and the step bottom surface of the step part was satisfactory because no void was present.

Tensile strength in the trial NO. 9 was 488 N/mm in a section where the joining speed was 300 mm/minute, 501 N/mm in a section where the joining speed was 500 mm/minute, and 486 N/mm in a section where the joining speed was 700 mm/minute. All the tensile strengths of the trial No. 9 were high values.

Tensile strength in the trial NO. 10 was 81 N/mm in a section where the joining speed was 300 mm/minute, 283 N/mm in a section where the joining speed was 500 mm/minute, and 444 N/mm in a section where the joining speed was 700 mm/minute. The tensile strength of the trial No. 10 was an extremely low value in the section where the joining speed was 300 mm/minute.

SUMMARY

In the first test, the butt portion (equivalent to the first butt portion) of the step side surface of the step part and the side surface of the seal body is in the satisfactory joining state. Meanwhile, it is seen that the butt portion (equivalent to the second butt portion) of the step bottom surface and the back surface of the seal body is more securely frictionally stir-welded when the protrusion part is more deeply inserted than the step bottom surface of the step part using the rotary tool FA including the protrusion part as in the second to fourth tests. As in the third and fourth tests, the butt portion (equivalent to the first butt portion) of the step side surface of the step part and the side surface of the seal body is generally in a satisfactory joining state even if the inclined surface is not provided on the side surface of the seal body. Meanwhile, it is seen that it is desirable to provide the inclined surface in the seal body as in the second test because the recessed groove of the surface of the plasticized region is small.

REFERENCE SIGNS LIST

1 liquid-cooled jacket
2 jacket main body 3 seal body
F rotary tool
F1 coupled part
F2 stirring pin
J1 first butt portion
J2 second butt portion
W plasticized region

The invention claimed is:

1. A method for manufacturing a liquid-cooled jacket comprising:
   providing a jacket main body including a bottom part and a peripheral wall part rising from a peripheral edge of the bottom part to an end face; a seal body configured to seal an opening part of the jacket main body, the opening part defined by the end face of the peripheral wall part; and a rotary tool with a stirring pin to be used for joining the jacket main body and the seal body together,
   the jacket main body being formed of a first aluminum alloy, the seal body being formed of a second aluminum alloy, the first aluminum alloy being higher in hardness than the second aluminum alloy in material type,
   the stirring pin having a rotation center axis; an outer peripheral surface; and a flat distal end face, the stirring pin being tapered such that the outer peripheral surface is inclined to the rotation center axis, the flat distal end face having a protrusion part projecting downward therefrom,
   a preparing step of forming a step part having a step bottom surface and a step side surface on an inner peripheral edge of the peripheral wall part, the step side surface rising obliquely outwardly from the step bottom surface toward the opening part,
   a mounting step of mounting the seal body on the jacket main body and butting the step side surface and a side surface of the seal body with a gap having a substantial V shape in cross section to form a first butt portion and putting the step bottom surface and a back surface of the seal body on each other to form a second butt portion; and
   a main joining step of turning around the rotary tool along the first butt portion and performing friction stir welding while only the stirring pin of the rotary tool contacts the seal body, the flat distal end face of the stirring pin is inserted more deeply than the second butt portion, and the outer peripheral surface of the stirring pin contacts the step side surface of the jacket main body by an offset amount N, where N is $0<N\leq0.1.0$ mm.

2. The method for manufacturing a liquid-cooled jacket according to claim 1,
   wherein a plate thickness of the seal body is set larger than a height of the step side surface.

3. The method for manufacturing a liquid-cooled jacket according to claim 1,
   wherein an inclination angle of the outer peripheral surface of the stirring pin is set equal to an inclination angle of the step side surface.

4. The method for manufacturing a liquid-cooled jacket according to claim 1,
   wherein an inclined surface is formed on the side surface of the seal body, and
   wherein in the mounting step the step side surface and the inclined surface are brought into surface contact with each other.

5. The method for manufacturing a liquid-cooled jacket according to claim 1,
   wherein the seal body is formed of an aluminum alloy wrought material, and
   wherein the jacket main body is formed of an aluminum alloy cast material.

6. The method for manufacturing a liquid-cooled jacket according to claim 1,
   wherein the rotary tool is rotated clockwise with an outer peripheral surface of the rotary tool having a spiral groove engraved counterclockwise from a proximal end thereof toward a distal end thereof, and
   wherein the rotary tool is rotated counterclockwise with an outer peripheral surface of the rotary tool having a spiral groove engraved clockwise from a proximal end thereof toward a distal end thereof.

7. The method for manufacturing a liquid-cooled jacket according to claim 1,
   wherein in the main joining step a rotating direction and a traveling direction of the rotary tool are set such that a plasticized region formed in a moving track of the rotary tool has a region for the jacket main body side corresponding to a shear side and a region for the seal body side corresponding to a flow side.

8. A method for manufacturing a liquid-cooled jacket, comprising:
   providing a jacket main body including a bottom part and a peripheral wall part rising from a peripheral edge of the bottom part to an end face; a seal body configured to seal an opening part of the jacket main body, the opening part defined by the end face of the peripheral wall part; and a rotary tool with a stirring pin to be used for joining the jacket main body and the seal body together,
   the jacket main body being formed of a first aluminum alloy, the seal body being formed of a second aluminum alloy, the first aluminum alloy being higher in hardness than the second aluminum alloy in material type,
   the stirring pin having a rotation center axis; an outer peripheral surface; and a flat distal end face, the stirring pin being tapered such that the outer peripheral surface is inclined to the rotation center axis, the flat distal end face having a protrusion part projecting downward therefrom,
   a preparing step of forming a step part having a step bottom surface and a step side surface on an inner peripheral edge of the peripheral wall part, the step side surface rising obliquely outwardly from the step bottom surface toward the opening part;
   a mounting step of mounting the seal body on the jacket main body and butting the step side surface and a side surface of the seal body with a gap having a substantial V shape in cross section to form a first butt portion and putting the step bottom surface and a back surface of the seal body on each other to form a second butt portion; and
   a main joining step of turning around the rotary tool along the first butt portion and performing friction stir welding while only the stirring pin of the rotary tool contacts the seal body, the flat distal end face is located above the second butt portion, the protrusion part of the stirring pin is inserted more deeply than the step bottom surface, and the outer peripheral surface of the stirring pin contacts the step side surface by an offset amount N, where N is $0<N\leq1.0$ mm.

9. The method for manufacturing a liquid-cooled jacket according to claim 8,
   wherein a plate thickness of the seal body is set larger than a height of the step side surface.

10. The method for manufacturing a liquid-cooled jacket according to claim 8,
   wherein an inclination angle of the outer peripheral surface of the stirring pin is set equal to an inclination angle of the step side surface.

11. The method for manufacturing a liquid-cooled jacket according to claim 8,
   wherein an inclined surface is formed on the side surface of the seal body, and
   wherein in the mounting step the step side surface and the inclined surface are brought into surface contact with each other.

12. The method for manufacturing a liquid-cooled jacket according to claim 8,
   wherein the seal body is formed of an aluminum alloy wrought material, and
   wherein the jacket main body is formed of an aluminum alloy cast material.

13. The method for manufacturing a liquid-cooled jacket according to claim 8,
   wherein the rotary tool is rotated clockwise with an outer peripheral surface of the rotary tool having a spiral groove engraved counterclockwise from a proximal end thereof toward a distal end thereof, and
wherein the rotary tool is rotated counterclockwise with an outer peripheral surface of the rotary tool having a spiral groove engraved clockwise from a proximal end thereof toward a distal end thereof.

14. The method for manufacturing a liquid-cooled jacket according to claim 8,
   wherein in the main joining step a rotating direction and a traveling direction of the rotary tool are set such that a plasticized region formed in a moving track of the rotary tool has a region for the jacket main body side corresponding to a shear side and a region for the seal body side corresponding to a flow side.

\* \* \* \* \*